United States Patent
Khoshnevisan et al.

(10) Patent No.: US 12,328,727 B2
(45) Date of Patent: Jun. 10, 2025

(54) TECHNIQUES FOR PERFORMING UPLINK CONTROL CHANNEL BEAM HOPPING AND REPETITION

(71) Applicant: QUALCOMM Incorporated, San Diego, CA (US)

(72) Inventors: Mostafa Khoshnevisan, San Diego, CA (US); Yitao Chen, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 17/574,402

(22) Filed: Jan. 12, 2022

(65) Prior Publication Data
US 2022/0225379 A1 Jul. 14, 2022

Related U.S. Application Data

(60) Provisional application No. 63/136,712, filed on Jan. 13, 2021.

(51) Int. Cl.
*H04W 72/21* (2023.01)
*H04W 72/1268* (2023.01)

(52) U.S. Cl.
CPC ....... *H04W 72/21* (2023.01); *H04W 72/1268* (2013.01)

(58) Field of Classification Search
CPC ... H04W 72/563; H04W 28/02; H04W 72/21; Y02D 30/70; H04B 7/0408; H04L 5/0035; H04L 1/1861; H04L 1/08; H04L 1/1896
See application file for complete search history.

(56) References Cited

U.S. PATENT DOCUMENTS

| | | | |
|---|---|---|---|
| 2017/0359815 A1* | 12/2017 | Chendamarai Kannan | H04W 72/21 |
| 2020/0229104 A1* | 7/2020 | MolavianJazi | H04W 52/42 |
| 2021/0297114 A1* | 9/2021 | Zhang | H04L 5/001 |
| 2023/0124582 A1* | 4/2023 | Frenne | H04L 5/0012 370/329 |
| 2023/0137292 A1* | 5/2023 | Zhang | H04W 72/563 370/329 |
| 2023/0147122 A1* | 5/2023 | Canonne-Velasquez | H04L 1/08 370/329 |
| 2023/0276446 A1* | 8/2023 | Matsumura | H04B 7/0695 370/329 |

(Continued)

*Primary Examiner* — Mahran Y Abu Roumi
(74) *Attorney, Agent, or Firm* — Holland & Hart LLP

(57) ABSTRACT

Methods, systems, and devices for wireless communications are described. A user equipment (UE) may receive, from a base station, a message scheduling transmission, by the UE, of uplink control information (UCI) in an uplink control channel resource, such as a physical uplink control channel (PUCCH) resource. The UE may receive an indication that the UE is scheduled to transmit the UCI via a first beam during the uplink control channel resource and via a second beam during the uplink control channel resource, where the first beam may be directed to a first base station and the second beam may be directed to a second base station. The UE may determine a number of repetitions associated with transmitting the UCI, and transmit the UCI via one of inter-slot repetition, intra-uplink control channel resource beam hopping, or intra-slot repetition based on the number of repetitions.

28 Claims, 17 Drawing Sheets

(56) References Cited

U.S. PATENT DOCUMENTS

2024/0015732 A1* 1/2024 Muruganathan .. H04W 72/1268
2024/0098742 A1* 3/2024 Deghel ................. H04W 72/20
2024/0106614 A1* 3/2024 Gao ...................... H04L 5/0094

* cited by examiner

TECHNIQUES FOR PERFORMING UPLINK CONTROL CHANNEL BEAM HOPPING AND REPETITION

CROSS REFERENCE

The present application for patent claims the benefit of U.S. Provisional Patent Application No. 63/136,712 by KHOSHNEVISAN et al., entitled "TECHNIQUES FOR PERFORMING UPLINK CONTROL CHANNEL BEAM HOPPING AND REPETITION," filed Jan. 13, 2021, assigned to the assignee hereof, and expressly incorporated by reference herein.

TECHNICAL FIELD

The following relates to wireless communications, including techniques for performing uplink control channel beam hopping and repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to transmit an uplink transmission, such as a transmission including uplink control information (UCI). In some cases, the UE may be configured to transmit the uplink transmission via multiple beams, such as to transmit the uplink transmission to multiple base stations. Conventional techniques for configuring the UE to transmit the uplink transmission via multiple beams may be improved.

SUMMARY

The described techniques relate to improved methods, systems, devices, and apparatuses that support techniques for performing uplink control channel beam hopping and repetition. Generally, the described techniques provide for enhanced methods for configuring a user equipment (UE) to transmit uplink transmissions via multiple beams. A UE may receive, from a base station, a message scheduling transmission, by the UE, of an uplink transmission such as a transmission including uplink control information (UCI) in an uplink control channel resource (e.g., a physical uplink control channel (PUCCH) resource). The UE may receive an indication that the UE is scheduled to transmit the UCI via a first beam during the PUCCH resource and via a second beam during the PUCCH resource, where the first beam may be directed to a first base station and the second beam may be directed to a second base station, or the first beam and the second beam may be directed to the same base station. The UCI transmitted via the first beam and the UCI transmitted via the second beam may be the same or similar. The UE may determine a number of repetitions associated with transmitting the UCI. For example, the UE may determine whether the UE is configured to transmit the UCI via the first beam and the second beam in one PUCCH resource of one slot or sub-slot or in multiple slots of sub-slots. If the UE is configured to transmit the UCI via the first beam and the second beam in multiple slots or sub-slots, the UE may be configured with a number of repetitions greater than one. If the UE is configured to transmit the UCI in one slot or sub-slot, the UE may be configured with a number of repetitions equal to one (e.g., no repetitions). The UE may transmit the UCI via one of intra-PUCCH resource beam hopping (e.g., with repetitions or without repetitions), intra-slot repetition, or inter-slot repetition based on the number of repetitions.

A method for wireless communications at a UE is described. The method may include receiving, from a base station, a message scheduling transmission, by the UE, of UCI in an uplink control channel resource, receiving an indication that the UE is scheduled to transmit the UCI via a first beam during the uplink control channel resource and via a second beam during the uplink control channel resource, determining a number of repetitions associated with transmitting the UCI, and transmitting the UCI via one of inter-slot repetition, intra-uplink control channel resource beam hopping, or intra-slot repetition based on the number of repetitions.

An apparatus for wireless communications at a UE is described. The apparatus may include at least one processor, and memory coupled (e.g., operatively, communicatively, functionally, electronically, or electrically) with the at least one processor, the memory storing instructions executable by the at least one processor to cause the apparatus to receive, from a base station, a message scheduling transmission, by the UE, of UCI in an uplink control channel resource, receive an indication that the UE is scheduled to transmit the UCI via a first beam during the uplink control channel resource and via a second beam during the uplink control channel resource, determine a number of repetitions associated with transmitting the UCI, and transmit the UCI via one of inter-slot repetition, intra-uplink control channel resource beam hopping, or intra-slot repetition based on the number of repetitions.

Another apparatus for wireless communications at a UE is described. The apparatus may include means for receiving, from a base station, a message scheduling transmission, by the UE, of UCI in an uplink control channel resource, means for receiving an indication that the UE is scheduled to transmit the UCI via a first beam during the uplink control channel resource and via a second beam during the uplink control channel resource, means for determining a number of repetitions associated with transmitting the UCI, and means for transmitting the UCI via one of inter-slot repetition, intra-uplink control channel resource beam hopping, or intra-slot repetition based on the number of repetitions.

A non-transitory computer-readable medium storing code for wireless communications at a UE is described. The code may include instructions executable by at least one processor to receive, from a base station, a message scheduling transmission, by the UE, of UCI in an uplink control channel resource, receive an indication that the UE is scheduled to transmit the UCI via a first beam during the uplink control channel resource and via a second beam during the uplink control channel resource, determine a number of repetitions associated with transmitting the UCI, and transmit the UCI via one of inter-slot repetition, intra-uplink control channel resource beam hopping, or intra-slot repetition based on the number of repetitions.

In some examples of the method, apparatuses, and non-transitory computer-readable medium described herein, determining the number of repetitions may include operations, features, means, or instructions for receiving a second message indicating the number of repetitions associated with transmitting the UCI, the number of repetitions greater than one.

In some examples of the method, apparatuses, and non-transitory computer-readable medium described herein, transmitting the UCI may include operations, features, means, or instructions for determining to transmit the UCI via inter-slot repetition based on the number of repetitions being greater than one, transmitting the UCI via the first beam during the uplink control channel resource in a first slot, and transmitting the UCI via the second beam during the uplink control channel resource in a second slot, the second slot different than the first slot.

In some examples of the method, apparatuses, and non-transitory computer-readable medium described herein, transmitting the UCI may include operations, features, means, or instructions for determining to transmit the UCI via intra-slot repetition based on the number of repetitions being greater than one, transmitting the UCI via the first beam during the uplink control channel resource in a first sub-slot of a slot, and transmitting the UCI via the second beam during the uplink control channel resource in a second sub-slot of the slot, the second sub-slot different than the first sub-slot.

In some examples of the method, apparatuses, and non-transitory computer-readable medium described herein, the number of repetitions may be equal to one repetition, and transmitting the UCI may include operations, features, means, or instructions for determining to transmit the UCI via intra-uplink control channel resource beam hopping based on the number of repetitions being equal to one, transmitting the UCI via the first beam during a first set of symbols of the uplink control channel resource, and transmitting the UCI via the second beam during a second set of symbols of the uplink control channel resource, the second set of symbols different than the first set of symbols.

Some examples of the method, apparatuses, and non-transitory computer-readable medium described herein may further include operations, features, means, or instructions for receiving a second message indicating that the UE may be scheduled to transmit the UCI via the first beam and the second beam according to intra-uplink control channel resource beam hopping, the second message included in a medium access control (MAC) control element (MAC-CE), where transmitting the UCI via intra-uplink control channel resource beam hopping may be based on the second message and the number of repetitions being greater than one.

Some examples of the method, apparatuses, and non-transitory computer-readable medium described herein may further include operations, features, means, or instructions for monitoring for a second message indicating that the UE may be enabled to perform intra-uplink control channel resource beam hopping.

Some examples of the method, apparatuses, and non-transitory computer-readable medium described herein may further include operations, features, means, or instructions for receiving the second message indicating that the UE may be enabled to perform intra-uplink control channel resource beam hopping, where transmitting the UCI via intra-uplink control channel resource beam hopping may be based on the second message and the number of repetitions being greater than one.

In some examples of the method, apparatuses, and non-transitory computer-readable medium described herein, transmitting the UCI may include operations, features, means, or instructions for transmitting the UCI via inter-slot repetition or intra-slot repetition based on not receiving the second message.

Some examples of the method, apparatuses, and non-transitory computer-readable medium described herein may further include operations, features, means, or instructions for receiving a second message indicating a first set of UCI types and a second set of UCI types, the second message indicating that the first set of UCI types may be associated with intra-uplink control channel resource beam hopping and that the second set of UCI types may be associated with inter-slot repetition or intra-slot repetition.

Some examples of the method, apparatuses, and non-transitory computer-readable medium described herein may further include operations, features, means, or instructions for determining that the UCI may be in the first set of UCI types and transmitting the UCI via intra-uplink control channel resource beam hopping based on the UCI being in the first set of UCI types and the number of repetitions being greater than one.

Some examples of the method, apparatuses, and non-transitory computer-readable medium described herein may further include operations, features, means, or instructions for determining that the UCI may be in the second set of UCI types and transmitting the UCI via inter-slot repetition or intra-slot repetition based on the UCI being in the second set of UCI types.

Some examples of the method, apparatuses, and non-transitory computer-readable medium described herein may further include operations, features, means, or instructions for determining that a payload of the UCI may be greater than a threshold payload size and transmitting the UCI via intra-uplink control channel resource beam hopping based on the payload of the UCI being greater than the threshold payload size and the number of repetitions being greater than one.

Some examples of the method, apparatuses, and non-transitory computer-readable medium described herein may further include operations, features, means, or instructions for determining that a payload of the UCI may be less than a threshold payload size and transmitting the UCI via inter-slot repetition or intra-slot repetition based on the payload of the UCI being less than the threshold payload size.

Some examples of the method, apparatuses, and non-transitory computer-readable medium described herein may further include operations, features, means, or instructions for monitoring for a second message indicating that the UE may be enabled to perform intra-uplink control channel resource beam hopping or indicating the number of repetitions associated with transmitting the UCI and transmitting the UCI via the first beam without repetition based on not receiving the second message.

Some examples of the method, apparatuses, and non-transitory computer-readable medium described herein may further include operations, features, means, or instructions for monitoring for a second message indicating that the UE may be enabled to perform intra-uplink control channel resource beam hopping or indicating the number of repetitions associated with transmitting the UCI, determining the number of repetitions associated with transmitting the UCI may be equal to a default number of repetitions based on not receiving the second message, and transmitting the UCI via inter-slot repetition or intra-slot repetition in accordance with the default number of repetitions.

Some examples of the method, apparatuses, and non-transitory computer-readable medium described herein may further include operations, features, means, or instructions for monitoring for a second message indicating that the UE may be enabled to perform intra-uplink control channel resource beam hopping or indicating the number of repetitions associated with transmitting the UCI and transmitting the UCI via intra-uplink control channel resource beam hopping based on not receiving the second message.

A method for wireless communications at a base station is described. The method may include transmitting, to a UE, a message scheduling transmission, by the UE, of UCI in an uplink control channel resource, transmitting an indication that the UE is scheduled to transmit the UCI via a first beam during the uplink control channel resource and via a second beam during the uplink control channel resource, and receiving the UCI via one of inter-slot repetition, intra-uplink control channel resource beam hopping, or intra-slot repetition based on a number of repetitions.

An apparatus for wireless communications at a base station is described. The apparatus may include at least one processor, and memory coupled (e.g., operatively, communicatively, functionally, electronically, or electrically) with the at least one processor, the memory storing instructions executable by the at least one processor to cause the apparatus to transmit, to a UE, a message scheduling transmission, by the UE, of UCI in an uplink control channel resource, transmit an indication that the UE is scheduled to transmit the UCI via a first beam during the uplink control channel resource and via a second beam during the uplink control channel resource, and receive the UCI via one of inter-slot repetition, intra-uplink control channel resource beam hopping, or intra-slot repetition based on a number of repetitions.

Another apparatus for wireless communications at a base station is described. The apparatus may include means for transmitting, to a UE, a message scheduling transmission, by the UE, of UCI in an uplink control channel resource, means for transmitting an indication that the UE is scheduled to transmit the UCI via a first beam during the uplink control channel resource and via a second beam during the uplink control channel resource, and means for receiving the UCI via one of inter-slot repetition, intra-uplink control channel resource beam hopping, or intra-slot repetition based on a number of repetitions.

A non-transitory computer-readable medium storing code for wireless communications at a base station is described. The code may include instructions executable by at least one processor to transmit, to a UE, a message scheduling transmission, by the UE, of UCI in an uplink control channel resource, transmit an indication that the UE is scheduled to transmit the UCI via a first beam during the uplink control channel resource and via a second beam during the uplink control channel resource, and receive the UCI via one of inter-slot repetition, intra-uplink control channel resource beam hopping, or intra-slot repetition based on a number of repetitions.

Some examples of the method, apparatuses, and non-transitory computer-readable medium described herein may further include operations, features, means, or instructions for transmitting a second message indicating the number of repetitions associated with transmitting the UCI, the number of repetitions greater than one.

In some examples of the method, apparatuses, and non-transitory computer-readable medium described herein, receiving the UCI may include operations, features, means, or instructions for receiving the UCI via the first beam during the uplink control channel resource in a first slot based on the number of repetitions being greater than one and receiving the UCI via the second beam during the uplink control channel resource in a second slot based on the number of repetitions being greater than one, the second slot different than the first slot.

In some examples of the method, apparatuses, and non-transitory computer-readable medium described herein, receiving the UCI may include operations, features, means, or instructions for receiving the UCI via the first beam during the uplink control channel resource in a first sub-slot of a slot based on the number of repetitions being greater than one and receiving the UCI via the second beam during the uplink control channel resource in a second sub-slot of the slot based on the number of repetitions being greater than one, the second sub-slot different than the first sub-slot.

In some examples of the method, apparatuses, and non-transitory computer-readable medium described herein, receiving the UCI may include operations, features, means, or instructions for receiving the UCI via the first beam during a first set of symbols of the uplink control channel resource based on the number of repetitions associated with receiving the UCI being equal to one and receiving the UCI via the second beam during a second set of symbols of the uplink control channel resource, the second set of symbols different than the first set of symbols based on the number of repetitions associated with receiving the UCI being equal to one.

Some examples of the method, apparatuses, and non-transitory computer-readable medium described herein may further include operations, features, means, or instructions for transmitting a second message indicating that the UE may be scheduled to transmit the UCI via the first beam and the second beam according to intra-uplink control channel resource beam hopping, the second message included in a MAC-CE, where receiving the UCI via intra-uplink control channel resource beam hopping may be based on the second message and the number of repetitions being greater than one.

Some examples of the method, apparatuses, and non-transitory computer-readable medium described herein may further include operations, features, means, or instructions for transmitting a second message indicating that the UE may be enabled to perform intra-uplink control channel resource beam hopping, where receiving the UCI via intra-uplink control channel resource beam hopping may be based on the second message and the number of repetitions being greater than one.

Some examples of the method, apparatuses, and non-transitory computer-readable medium described herein may further include operations, features, means, or instructions for transmitting a second message indicating a first set of UCI types and a second set of UCI types, the second message indicating that the first set of UCI types may be associated with intra-uplink control channel resource beam hopping and that the second set of UCI types may be associated with inter-slot repetition or intra-slot repetition.

Some examples of the method, apparatuses, and non-transitory computer-readable medium described herein may further include operations, features, means, or instructions for receiving the UCI via intra-uplink control channel resource beam hopping based on the UCI being in the first set of UCI types and the number of repetitions being greater than one.

Some examples of the method, apparatuses, and non-transitory computer-readable medium described herein may further include operations, features, means, or instructions for receiving the UCI via inter-slot repetition or intra-slot repetition based on the UCI being in the second set of UCI types.

Some examples of the method, apparatuses, and non-transitory computer-readable medium described herein may further include operations, features, means, or instructions for receiving the UCI via intra-uplink control channel resource beam hopping based on a payload of the UCI being greater than a threshold and the number of repetitions being greater than one.

Some examples of the method, apparatuses, and non-transitory computer-readable medium described herein may further include operations, features, means, or instructions for receiving the UCI via inter-slot repetition or intra-slot repetition based on a payload of the UCI being less than a threshold.

Some examples of the method, apparatuses, and non-transitory computer-readable medium described herein may further include operations, features, means, or instructions for receiving the UCI via inter-slot repetition or intra-slot repetition in accordance with a default number of repetitions.

DETAILED DESCRIPTION

Figure 1:
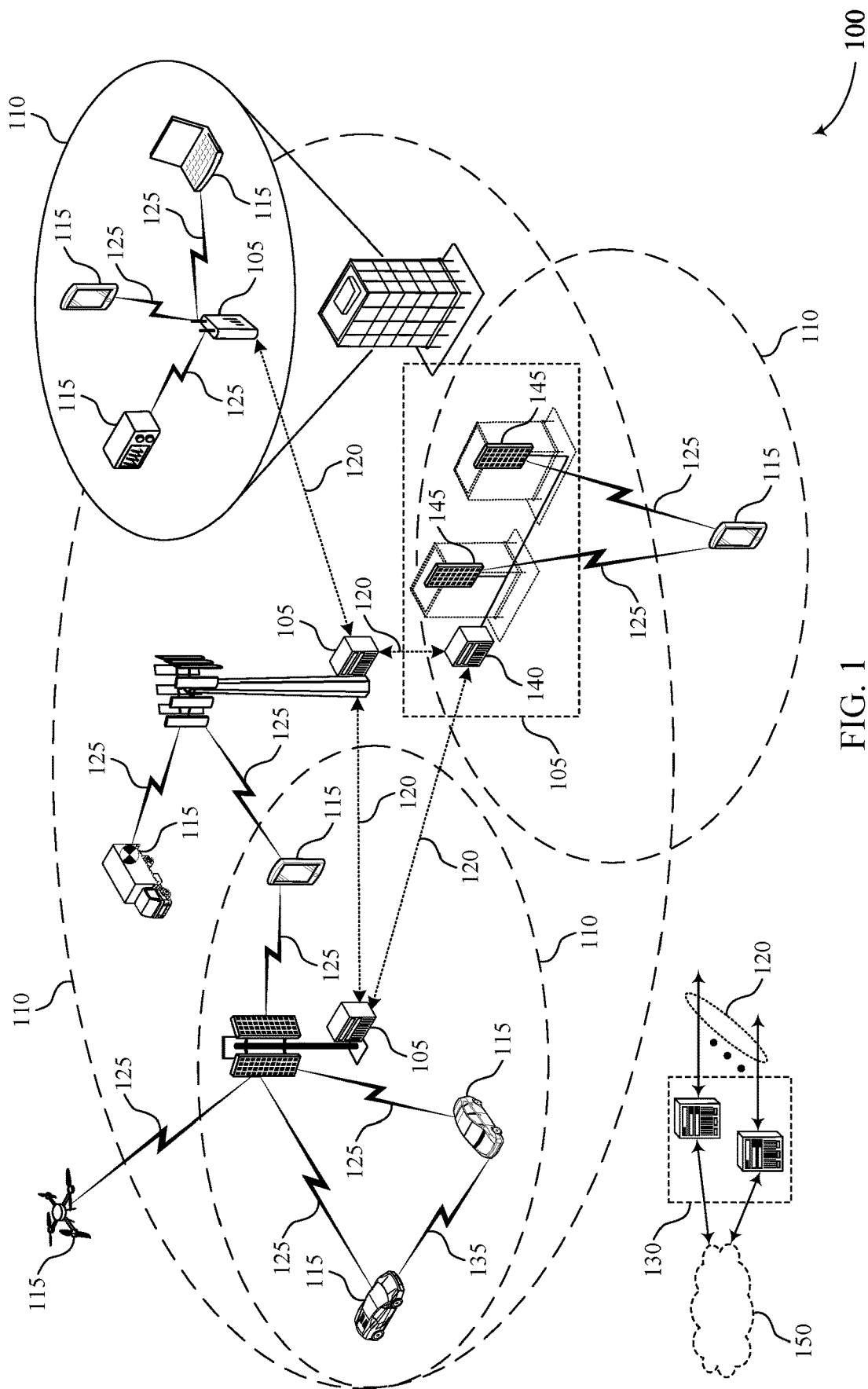
FIG. 1 illustrates an example of a wireless communications system that supports techniques for performing uplink control channel beam hopping and repetition in accordance with aspects of the present disclosure.

A wireless communications system may include various communication devices such as a user equipment (UE) and a base station, which may provide wireless communication services to the UE. In the wireless communications system, the UE may be configured to transmit one or more uplink transmissions to one or more base stations. For example, the UE may transmit an uplink transmission carrying uplink control information (UCI) to support various uplink operations (e.g., uplink transmissions, downlink reception). For example, the UCI may, in some examples, convey various information including feedback information (e.g., hybrid automatic repeat request acknowledgment (HARQ-ACK), scheduling information (e.g., scheduling requests (SR)), or channel information (e.g., channel state information (CSI)). The UE may encode and transmit one or more UCIs on an uplink channel, such as a physical uplink control channel (PUCCH). In some cases, the UE may be configured to transmit the one or more UCIs on allocated resources such as a PUCCH resource, where a PUCCH resource may refer to a set of allocated time and frequency resources, such as within a slot or sub-slot, on a PUCCH. As such, a PUCCH resource in a first slot and a PUCCH resource in a second slot that are allocated the same time and frequency resources may be referred to as the same PUCCH resource.

In some implementations, multiple beams (e.g., spatial relation informations) may be activated per PUCCH resource such that a UE may transmit an uplink transmission within a PUCCH resource via multiple beams (e.g., in one slot or sub-slot, or multiple slots or sub-slots), where each beam of the multiple beams may be directed to a different base station (e.g., base station, transmission reception point (TRP), node). For example, the UE may transmit the same UCI to different base stations via different beams so as to improve reliability of the UE's communications with one or more of the base stations. To support a UE transmitting an uplink transmission to multiple base stations (e.g., multi-TRP PUCCH transmission), the UE may be configured to transmit the uplink transmission in accordance with intra-PUCCH resource beam hopping, intra-slot repetition, or inter-slot repetition. Repetition may refer to transmitting the same (or similar) set of information (e.g., bits) multiple times, and thus, the set of information is repeated. For example, two repetitions may each carry the same set of information, such that the set of information may be transmitted via a first beam and the same set of information may be transmitted via the second beam. Beam hopping uses one set of information (e.g., bits), where a subset of the information is transmitted via the first beam and a second subset of the information is transmitted via the second beam.

As such, intra-PUCCH resource beam hopping may refer to a UE transmitting UCI via two different beams in the same PUCCH resource, where the UE may transmit UCI via a first beam in a first portion (e.g., a first set of symbols) of the PUCCH resource and transmit UCI in a second beam in a second portion (e.g., a second set of symbols) of the PUCCH resource. Intra-slot repetition may refer to a UE transmitting UCI via two different beams in a PUCCH resource in two different sub-slots of a slot, where the UE may transmit UCI via a first beam in a PUCCH resource of a first sub-slot and transmit UCI via a second beam in the PUCCH resource of a second sub-slot. The PUCCH resource used in the first sub-slot and the second sub-slot may be the same PUCCH resource. As the UE is configured to transmit the same UCI in a PUCCH resource in two different sub-slots, the UCI transmitted in the second sub-slot may be repeated UCI of the UCI transmitted in the first sub-slot. Inter-slot repetition may refer to a UE transmitting UCI via two different beams in a PUCCH resource in two different slots, where the UE may transmit UCI via a first beam in a PUCCH resource of a first slot and transmit UCI via a second beam in the PUCCH resource of a second slot. The PUCCH resource used in the first slot and the second slot may be the same PUCCH resource. As the UE is configured to transmit the same UCI in a PUCCH resource in two different slots, the UCI transmitted in the second slot may be repeated UCI of the UCI transmitted in the first slot.

In some implementations, a UE may receive information for transmitting the UCI that may implicitly or explicitly indicate that the UE transmits the UCI in accordance with intra-PUCCH resource beam hopping, intra-slot repetition, or inter-slot repetition. For example, the information may indicate a number of repetitions associated with transmitting the UCI, where the number of repetitions may be indicated for slots or sub-slots. For example, the UE may be triggered to perform inter-slot repetition if the number of repetitions in relation to slots is greater than one so as to allow the UE to transmit repeated UCI in a PUCCH resource in two different slots. In another example, the UE may be triggered to perform intra-slot repetition if the number of repetitions in relation to sub-slots is greater than one so as to allow the UE to transmit repeated UCI in a PUCCH resource in two different sub-slots, such that the UE may perform repetitions within a slot. In another example, the UE may be triggered to perform intra-PUCCH resource beam hopping if the number of repetitions is equal to one (e.g., no repetition), or if the UE did not receive an indication of a number of repetitions because the UE may transmit the UCI within one PUCCH resource.

However, in some implementations, intra-PUCCH resource beam hopping with repetitions in which the UE may perform intra-PUCCH resource beam hopping in multiple slots (e.g., or sub-slots) may be a beneficial transmission configuration. For example, the UE may transmit UCI via a first beam in a first portion of a PUCCH resource and transmit UCI via a second beam in a second portion of a PUCCH resource in a first slot and the UE may transmit according to the same configuration in a second slot, or third slot. Conventional methods for distinguishing between intra-PUCCH resource beam hopping with repetitions, intra-slot repetition, and inter-slot repetition may be improved. The UE may receive an indication to transmit UCI via multiple beams in accordance with multiple repetitions. To distinguish between intra-PUCCH resource beam hopping with repetitions, intra-slot repetition, and inter-slot repetition, the UE, in some cases, may receive an indication (e.g., in radio resource control (RRC) or medium access control (MAC) control element (CE)) of whether to transmit the UCI in accordance with intra-PUCCH resource beam hopping with repetitions, inter-slot repetition, or intra-slot repetition. In some cases, the UE may be configured to perform intra-PUCCH resource beam hopping with repetitions based on the type of UCI the UE is configured to transmit, or based on a payload size of the UCI the UE is configured to transmit. In some implementations, the option for the UE to perform intra-PUCCH resource beam hopping with repetitions by be turned off, or the UE may otherwise not be configured to perform intra-PUCCH resource beam hopping with repetitions. In such cases, if the UE receives an indication that the number of repetitions is greater than one (e.g., for slots, or sub-slots), then the UE may default to inter-slot repetition, or intra-slot repetition, accordingly. If a number of repetitions is not configured, or if the number of repetitions is equal to one, then the UE may default to intra-PUCCH resource beam hopping (without repetitions).

Particular aspects of the subject matter described herein may be implemented to realize one or more advantages. The described techniques may support improvements in indicating to a UE a UCI transmission configuration by improving reliability and clarity, among other advantages. As such, supported techniques may include improved network operations and, in some examples, may promote network efficiencies, among other benefits.

Aspects of the disclosure are initially described in the context of wireless communications systems. Aspects are then described with reference to transmission configurations and a process flow. Aspects of the disclosure are further illustrated by and described with reference to apparatus diagrams, system diagrams, and flowcharts that relate to techniques for performing uplink control channel beam hopping and repetition.

FIG. 1 illustrates an example of a wireless communications system 100 that supports techniques for performing uplink control channel beam hopping and repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications system 100, a UE 115 may receive, from a base station 105, a message scheduling transmission, by the UE 115, of an uplink transmission such as a transmission including UCI in an uplink control channel resource (e.g., a PUCCH resource). The UE 115 may receive an indication that the UE 115 is scheduled to transmit the UCI via a first beam during the PUCCH resource and via a second beam during the PUCCH resource (e.g., in one PUCCH resource, in repeated PUCCH resources in multiple slots, or in repeated PUCCH resources in multiple sub-slots), where the first beam may be directed to a first base station and the second beam may be directed to a second base station, or the first beam and the second beam may be directed to the same base station. The UCI transmitted via the first beam and the UCI transmitted via the second beam may be the same or similar. The UE 115 may determine a number of repetitions associated with transmitting the UCI. For example, the UE 115 may determine whether the UE 115 is configured to transmit the UCI via the first beam and the second beam in one PUCCH resource or multiple. If the UE 115 is configured to transmit the UCI via the first beam and the second beam in multiple PUCCH resources (e.g., multiple repeated PUCCH resources in multiple slots or sub-slots), the UE 115 may be configured with a number of repetitions greater than one. If the UE 115 is configured to transmit the UCI in one PUCCH resource (e.g., in one slot or sub-slot), the UE 115 may be configured with a number of repetitions equal to one (e.g., no repetitions). The UE 115 may transmit the UCI via one of intra-PUCCH resource beam hopping (e.g., with repetitions or without repetitions), intra-slot repetition, or inter-slot repetition based on the number of repetitions.

Figure 2:
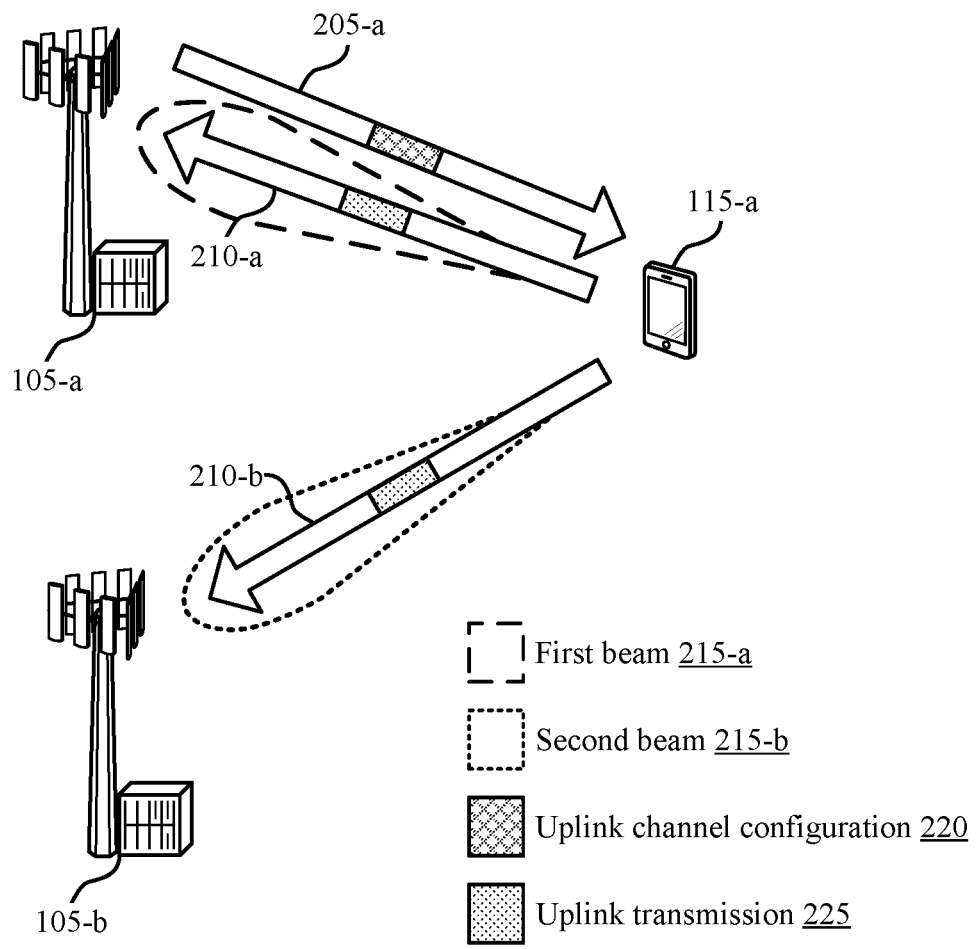
FIG. 2 illustrates an example of a wireless communications system that supports techniques for performing uplink control channel beam hopping and repetition in accordance with aspects of the present disclosure.

FIG. 2 illustrates an example of a wireless communications system 200 that supports techniques for performing uplink control channel beam hopping and repetition in accordance with aspects of the present disclosure. The wireless communications system 200 may include base stations 105-a and 105-b and UE 115-a, which may be examples of base stations 105 and a UE 115 as described with reference to FIG. 1. Base station 105-a and base station 105-b may each serve a geographic coverage area, that may be the same, partially the same, or different from one another. In some cases, UE 115-a may be configured to perform a UCI transmission procedure in which UE 115-a may transmit UCI via one or more beams 215. Additionally or alternatively, other wireless devices, such as base station 105-a and/or base station 105-b may indicate a UCI transmission configuration and or receive the UCI transmission from UE 115-a.

In some implementations, a UE 115 may communicate with a serving base station 105 of the UE 115 and/or communicate with one or more other base stations 105, such as neighboring base stations 105 to the UE 115. A base station 105 as described herein may refer to a TRP, integrated access and backhaul (IAB) node, or a wireless device. For example, UE 115-a and base station 105-a may be in communications with one another, where base station 105-a may be a serving base station 105 of UE 115-a. UE 115-a may receive one or more signals from base station 105-a via communication link 205-a, which may be a downlink communications link. In some cases, UE 115-a may transmit one or more signals to base station 105-a via communication link 210-a, which may be an uplink communications link. Additionally or alternatively, UE 115-a may transmit one or more signals to base station 105-b (e.g., a neighboring base station 105, a base station 105 near UE 115-a) via communication link 210-b, which may be an uplink communications link. For example, UE 115-a may receive an uplink channel configuration 220 from base station 105-a that may configure UE 115-a to transmit one or more uplink transmissions 225 (e.g., UCI) via one or more beams in one or more uplink resources. For example, base station 105-a may configure UE 115-a to transmit UCI in a PUCCH resource via a first beam 215-a directed to base station 105-a and via a second beam 215-b directed to base station 105-b in accordance with intra-PUCCH resource beam hopping (e.g., with or without repetition), inter-slot repetition, or intra-slot beaming hopping. In some cases, UE 115-a may receive an uplink channel configuration 220 from base station 105-b that may configure UE 115-a to transmit one or more uplink transmissions 225 (e.g., UCI) via one or more beams in one or more uplink resources.

For example, a UE 115 may transmit an uplink transmission carrying UCI to support various uplink operations (e.g., uplink transmissions, downlink reception). The UCI may, in some examples, convey various information including feedback information (e.g., HARQ-ACK, scheduling information (e.g., an SR), channel information (e.g., CSI). The UE 115 may encode and transmit one or more UCIs on an uplink channel, such as a PUCCH. In some cases, the UE 115 may be configured to transmit the one or more UCIs on allocated resources such as a PUCCH resource, where a PUCCH resource may refer to a set of allocated time and frequency resources on a PUCCH, such as within a slot, or sub-slot. As such, a PUCCH resource in a first slot and a PUCCH resource in a second slot that are allocated the same time and frequency resources may be referred to as the same PUCCH resource. In some implementations, a UE 115 may be configured to support PUCCH repetition in different slots, or sub-slots in which the UE 115 may transmit uplink information in a PUCCH resource of a first slot (or sub-slot), and may repeat and transmit the uplink information in the same PUCCH resource in a second slot (or sub-slot), and so on.

PUCCH repetition (e.g., a number of repetitions, slot repetition, sub-slot repetition) may be configured for certain PUCCH formats, such as PUCCH formats 1, 3, and 4. As such, for at least PUCCH formats 1, 3, or 4, a UE 115 may be configured a number of slots (or sub-slots) for repetitions of a PUCCH transmission. The number of repetitions (e.g., number of slots, number of sub-slots) may be configured per PUCCH format, and may be configured via a radio resource control (RRC) configuration. For example, RRC signaling may include a field that indicates a number of slots (e.g., nrofSlots) for PUCCH format 1, PUCCH format 3, or PUCCH format 4, or a combination thereof, where the number of slots configured for each PUCCH format may be the same or different. The number of slots field may indicate any number greater than zero, such as 1 (e.g., no repetition), 2, 4, 8, where the number of slots is equal to the number of repetitions (e.g., nrofSlots=N_repeat). For example, PUCCH format 1 may be allocated a number of slots equal to two, PUCCH format 3 may be allocated a number of slots equal to four, and PUCCH format 4 may be allocated a number of slots equal to eight. In some cases, PUCCH repetition (e.g., a number of repetitions, slot repetition, sub-slot repetition) may be configured per PUCCH resource, rather than PUCCH format.

If the UE 115 is configured to transmit an uplink transmission in a PUCCH resource that has been allocated a number of n slots, the UE 115 may transmit the uplink transmission in a PUCCH resource repetition in n slots (e.g., the PUCCH resource is repeated n times). For example, UE 115-*a* may be configured to transmit an uplink transmission in a PUCCH resource configured as PUCCH format 1. As such, UE 115-*a* may transmit the uplink transmission in the PUCCH resource in a first slot, and transmit the same, repeated uplink transmission in the PUCCH resource in a second slot.

In some implementations, the UE 115 may transmit the repeated uplink transmission using one beam 215, or multiple beams 215. For example, a UE 115 may be configured with one or more activated beams 215 (e.g., activated spatial relation informations) per PUCCH resource, such that the UE 115 may be enabled to transmit the same PUCCH transmission of the same UCI via multiple beams 215, where each beam 215 of the multiple beams 215 may be directed at different base stations 105 (e.g., TRPs) so as to improve reliability of the network. In some cases, UE 115-*a* may receive the indication of the activated beams 215 (e.g., the multiple activated beams 215) via a MAC-CE message. The indication may implicitly or explicitly indicate a number of activated beams 215, and/or the identity of the activated beams 215. For example, UE 115-*a* may receive an indication to transmit UCI in a PUCCH resource that is configured with or without repetitions, and UE 115-*a* may receive an indication that multiple beams 215, such as two beams 215, are activated for that PUCCH resource. As such, UE 115-*a* may be configured to transmit the UCI in the PUCCH resource (in one or more slots, or sub-slots) via a first beam 215-*a* directed to base station 105-*a* and via a second beams 215-*b* directed to base station 105-*b*. In some cases, UE 115-*a* may transmit the UCI via the first beam 215-*a* at a first transmission power, and transmit the UCI via a second beam 215-*b* at a second transmission power, where the first transmission power and the second transmission power may be the same or different. The examples described herein may describe a UE 115 transmitting UCI in a PUCCH resource via two beams 215, although, the UE 115 may be configured to transmit any uplink transmission in a PUCCH resource (e.g., not limited to UCI) via any number of beams 215 (e.g., not limited to two beams 215).

To support UE 115-*a* transmitting a PUCCH transmission (e.g., UCI) via multiple beams (e.g., multi-TRP PUCCH transmission), UE 115-*a* may be configured to transmit the PUCCH transmission in accordance with intra-PUCCH resource beam hopping (e.g., with or without repetition), intra-slot repetition, or inter-slot repetition. Intra-PUCCH resource beam hopping, as described with reference to FIGS. 4A and 4B, may refer to a UE 115 transmitting UCI via two different beams in the same PUCCH resource, where the UE 115 may transmit UCI via a first beam 215-*a* in a first portion of the PUCCH resource and transmit UCI via a second beam 215-*b* in a second portion of the PUCCH resource. Intra-slot repetition, as described with reference to FIG. 3B, may refer to a UE 115 transmitting UCI via two different beams 215 in a PUCCH resource in two different sub-slots of a slot, where the UE 115 may transmit UCI via a first beam 215-*a* in a PUCCH resource of a first sub-slot and transmit UCI via a second beam 215-*b* in the PUCCH resource of a second sub-slot. The PUCCH resource used in the first sub-slot and the second sub-slot may be the same PUCCH resource. As the UE 115 is configured to transmit the same UCI in a PUCCH resource in two different sub-slots, the UCI transmitted in the second sub-slot may be repeated UCI of the UCI transmitted in the first sub-slot. Inter-slot repetition, as described with reference to FIG. 3A, may refer to a UE 115 transmitting UCI via two different beams 215 in a PUCCH resource in two different slots, where the UE 115 may transmit UCI via a first beam 215-*a* in a PUCCH resource of a first slot and transmit UCI via a second beam 215-*b* in the PUCCH resource of a second slot. The PUCCH resource used in the first slot and the second slot may be the same PUCCH resource. As the UE 115 is configured to transmit the same UCI in a PUCCH resource in two different slots, the UCI transmitted in the second slot may be repeated UCI of the UCI transmitted in the first slot.

In some cases, UE 115-*a* may determine which one of intra-PUCCH resource beam hopping (e.g., without repetition), intra-slot repetition, or inter-slot repetition to use based on a number of repetitions associated with the PUCCH format of the PUCCH resource. For example, UE 115-*a* may be configured to transmit the UCI in a PUCCH format, such as PUCCH format 1, that has been configured with two slots (e.g., nrofSlots=2). In such cases, UE 115-*a* may be configured to transmit the UCI via the multiple beams 215 in accordance with inter-slot repetition based on inter-slot repetition allowing a UE 115 to transmit UCI in one slot and repeated UCI in a second slot (e.g., two slots). In another example, UE 115-*a* may be configured to transmit the UCI in a PUCCH format that has been configured with two sub-slots of a slot. In such cases, UE 115-*a* may be configured to transmit the UCI via the multiple beams 215 in accordance with intra-slot repetition based on intra-slot repetition allowing a UE 115 to transmit UCI in one sub-slot and repeated UCI in a second sub-slot (e.g., two sub-slots). In another example, UE 115-*a* may be configured to transmit the UCI in a PUCCH format that has been configured with one slot (or sub-slot), or has not been assigned a number of slots (or sub-slots), as such UE 115-*a* may not transmit the UCI with repetitions and thus may be configured to transmit the UCI via the multiple beams 215 in accordance with intra-PUCCH resource beam hopping because the UE 115 may transmit the UCI via a first portion of a PUCCH resource and via a second portion of the same PUCCH resource, such that the UCI transmission may be performed without repetition of the PUCCH resource.

In some implementations, intra-PUCCH resource beam hopping with repetitions, as described with reference to FIG. 4B, in which the UE 115 may perform intra-PUCCH resource beam hopping in multiple slots (e.g., or sub-slots) may be a beneficial transmission configuration. For example, UE 115-*a* may transmit UCI via a first beam 215-*a* in a first portion of a PUCCH resource and transmit UCI via a second beam 215-*b* in a second portion of a PUCCH resource in a first slot and UE 115-*a* may transmit according to the same configuration in a second slot, or third slot. As such, if UE 115-*a* is configured with UCI to transmit in a PUCCH resource that is associated with a number of repetitions greater than one (e.g., a number of slots or sub-slots greater than one) and UE 115-*a* receives an indication that multiple beams 215 (e.g., a first beam 215-*a* and a second beam 215-*b*) are activated for the PUCCH resource, UE 115-*a* may be configured with a method for determining to use intra-PUCCH resource beam hopping with repetitions, intra-slot repetition, or inter-slot repetition for the multi-beam UCI transmission with repetition.

In some implementations, UE 115-*a* may receive an indication of a transmission configuration to use to distinguish between intra-PUCCH resource beam hopping with repetition, intra-slot repetition, and inter-slot repetition in which each configuration is associated with a number of PUCCH repetitions greater than one. In some cases, UE 115-*a* may receive an indication that indicates that UE 115-*a* should use intra-PUCCH resource beam hopping with repetition for the multi-beam UCI transmission. The indication may be included in RRC signaling or MAC-CE signaling. For example, if UE 115-*a* receives an indication to transmit UCI in a PUCCH resource configured with a number of repetitions greater than one, and receives an indication that multiple beams are activated (e.g., more than one spatial relation information is activated) for the PUCCH resource, such as in a MAC-CE message, then UE 115-*a* may receive an additional indication that UE 115-*a* is to transmit the UCI via the multiple beams 215 in accordance with a certain transmission configuration. The additional indication may be included in the MAC-CE message. In some cases, the additional indication may indicate that UE 115-*a* is to transmit the UCI via the multiple beams 215 in accordance with intra-PUCCH resource beam hopping with repetition. In some cases, the additional indication may indicate that UE 115-*a* is to transmit the UCI via the multiple beams 215 in accordance with inter-slot repetition. In some cases, the additional indication may indicate that UE 115-*a* is to transmit the UCI via the multiple beams 215 in accordance with intra-slot repetition. In some cases, the additional indication may indicate that UE 115-*a* is to transmit the UCI via the multiple beams 215 not in accordance with intra-PUCCH resource beam hopping with repetition. In such a case, UE 115-*a* may default to inter-slot repetition or intra-slot repetition based on whether UE 115-*a* is configured to repeat the UCI in slots or sub-slots.

In some implementations, UE 115-*a* may receive an indication that enables intra-PUCCH resource beam hopping with repetition, where UE 115-*a* may receive the indication dynamically, semi-statically, or aperiodically. For example, UE 115-*a* may receive an RRC message that indicates that intra-PUCCH resource beam hopping with repetition is enabled, where the indication may be included in the RRC message as an RRC parameter. When intra-PUCCH resource beam hopping with repetition is enabled, UE 115-*a* may default to intra-PUCCH resource beam hopping with repetition to transmit the UCI via the multiple beams 215 in accordance with the number of repetitions and the repetition configuration (e.g., PUCCH repetition in different slots, or different sub-slots) associated with the PUCCH resource, or PUCCH format of the PUCCH resource. If intra-PUCCH resource beam hopping with repetition is not enabled (e.g., disabled), UE 115-*a* may default to inter-slot repetition or intra-slot repetition based on whether UE 115-*a* is configured to repeat the UCI in slots or sub-slots. In some cases, the RRC parameter may be configured per PUCCH resource or per PUCCH format. For example, intra-PUCCH resource beam hopping with repetition may be enabled or disabled per PUCCH resource (e.g., per certain time and frequency resources within a slot). In another example, intra-PUCCH resource beam hopping with repetition may be enabled or disabled per PUCCH format, and as such, the UE 115 may determine the intra-PUCCH resource beam hopping with repetition enablement or disablement of an PUCCH resource based on the PUCCH format associated with the PUCCH resource.

In some implementations, UE 115-*a* may be configured dynamically, semi-persistently, or aperiodically to determine which transmission configuration to use based on the type of UCI the UE 115 is configured to transmit and/or based on the payload of the UCI the UE 115 is configured to transmit. For example, UE 115-*a* may be configured to determine to use intra-PUCCH resource beam hopping with repetition based on a type of UCI UE 115-*a* is configured to transmit. UE 115-*a* may receive or otherwise be configured with a mapping (e.g., a lookup table) of UCI types that are associated with intra-PUCCH resource beam hopping, UCI types that are associated with intra-slot repetition, and/or UCI types that are associated with inter-slot repetition. In some cases, the mapping may include only the UCI types mapped to the intra-PUCCH resource beam hopping. The mappings may be updated dynamically, aperiodically, or semi-persistently, such as via RRC signaling, MAC-CE signaling, or downlink control information (DCI) signaling. As such, UE 115-*a* may determine the type of UCI UE 115-*a* is configured to transmit, determine the transmission configuration associated with the UCI type, and transmit the multi-beam UCI transmission in accordance with the determined transmission configuration. In the cases that the mapping does not include the determined UCI type, UE 115-*a* may determine that UE 115-*a* is to transmit the UCI transmission in accordance with inter-slot or intra-slot repetition based on whether UE 115-*a* is configured to repeat the UCI in slots or sub-slots.

In another example, UE 115-*a* may be configured to determine to use intra-PUCCH resource beam hopping with repetition based on a payload of the UCI UE 115-*a* is configured to transmit. UE 115-*a* may be configured dynamically, semi-persistently, or aperiodically with one or more UCI payload thresholds. For example, UE 115-*a* may be configured with one UCI payload threshold. If the payload of the UCI UE 115-*a* is configured to transmit is greater than the UCI payload threshold, UE 115-*a* may determine to transmit the multi-beam UCI transmission in accordance with an intra-PUCCH resource. If the payload of the UCI UE 115-*a* is configured to transmit is less than the UCI payload threshold, UE 115-*a* may determine to transmit the multi-beam UCI transmission in accordance with inter-slot or intra-slot repetition based on whether UE 115-*a* is configured to repeat the UCI in slots or sub-slots. The one or more UCI payload thresholds may be updated dynamically, aperiodically, or semi-persistently, such as via RRC signaling, MAC-CE signaling, or DCI signaling.

In some implementations, a UE 115 may not be configured to perform intra-PUCCH resource beam hopping with repetition. In some cases, intra-PUCCH resource beam hopping with repetition may be disabled, as described herein, or a UE 115-*a* may not be configured with the ability to transmit in accordance with intra-PUCCH resource beam hopping with repetition. In either case, UE 115-*a* may determine which transmission configuration to use based on a number of repetitions. If UE 115-*a* is configured to transmit UCI via multiple beams with no repetitions (e.g., repetitions equal to one, slots equal to one, sub-slots equal to one), then UE 115-*a* may determine to use intra-PUCCH resource beam hopping without repetitions. If UE 115-*a* is configured to transmit UCI via multiple beams with a number of repetitions greater than one (e.g., a number of slots greater than one, a number of sub-slots greater than one), then UE 115-*a* may determine to use intra-slot repetition or inter-slot repetition based on whether UE 115-*a* is configured to repeat the UCI in slots or sub-slots and in accordance with the number of repetitions.

Additionally or alternatively, UE 115-*a* may be configured to determine to use intra-PUCCH resource beam hopping without repetitions based on receiving an RRC parameter that enables intra-PUCCH resource beam hopping without repetitions (e.g., enableBeamHopping), where intra-PUCCH resource beam hopping without repetitions may be enabled per PUCCH resource or per PUCCH format. In some cases, if UE 115-*a* receives the RRC indication that intra-PUCCH resource beam hopping without repetitions is enabled for a PUCCH resource or PUCCH format that is associated with a number of repetitions greater than one, then UE 115-*a* may determine that an error has occurred because UE 115-*a* may not be configured to perform intra-PUCCH resource beam hopping with repetitions.

In either case that UE 115-*a* is able or unable to perform intra-PUCCH resource beam hopping with repetitions, UE 115-*a* may be configured to determine one or more error cases. For example, if a UE 115 is configured to transmit UCI in a PUCCH resource in which more than one beam is activated (e.g., by MAC-CE), but the UE 115 is not configured with a number of repetitions greater than one, and the UE 115 is not configured with intra-PUCCH resource beam hopping without repetition, then the UE 115 may determine that an error has occurred because the UE 115 is not enabled to use a transmission configuration without repetition, but the UE 115 also has no repetitions to transmit. In some cases, if UE 115-*a* detects an error, then UE 115-*a* may be configured to fall back to a default transmission configuration. For example, UE 115-*a* may be configured to transmit UCI in the configured PUCCH resource without repetition and using one of the multiple activated beams (e.g., the first indicated beam, the first activated beam, the beam directed at the serving base station 105) as a default transmission configuration. In some cases, if UE 115-*a* detects an error, or otherwise, UE 115-*a* may be configured to default to inter-slot repetition with a default number of repetitions, such as two slot repetitions. In some cases, if UE 115-*a* detects an error, or otherwise, UE 115-*a* may be configured to default to intra-slot repetition with a default number of repetitions, such as two sub-slot repetitions. In some cases, if UE 115-*a* detects an error, or otherwise, UE 115-*a* may be configured to default to intra-PUCCH resource beam hopping without repetitions. In some cases, if UE 115-*a* detects an error, or otherwise, UE 115-*a* may be configured to default to intra-PUCCH resource beam hopping with repetitions, in accordance with a default number of repetitions, such as two slot or sub-slot repetitions.

Figure 3A:
FIGS. 3A through 4B illustrate examples of transmission configurations that support techniques for performing uplink control channel beam hopping and repetition in accordance with aspects of the present disclosure.
Figure 3A:
Figure 3A:
Figure 3A:
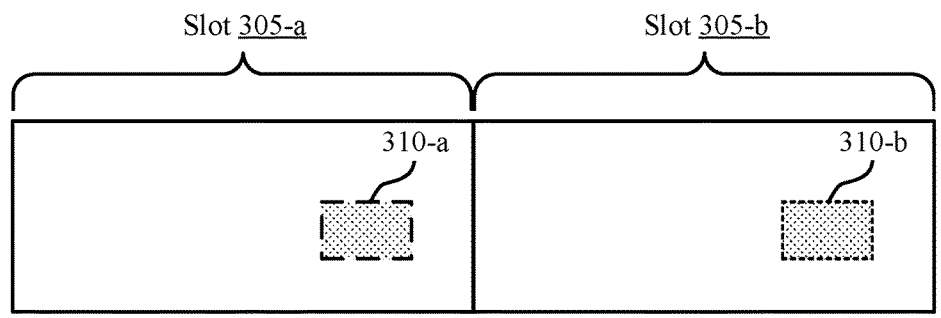
Figure 3B:
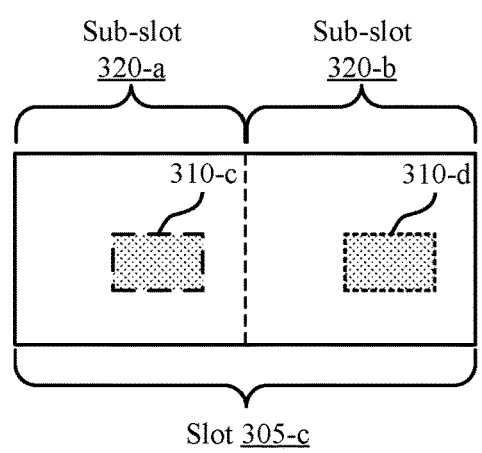

FIGS. 3A and 3B illustrate examples of transmission configurations 300 and 301 that support techniques for performing uplink control channel beam hopping and repetition in accordance with aspects of the present disclosure. The transmission configurations 300 and 301 may be implemented by a base station and a UE, which may be examples of a base station and a UE as described with reference to FIGS. 1 and 2. In some cases, a UE may be configured to perform a UCI transmission procedure in which the UE may transmit UCI via one or more beams to one or more base stations. The UE may transmit the UCI in accordance with transmission configuration 300 or transmission configuration 301. Additionally or alternatively, other wireless devices, such as a base station may indicate a UCI transmission configuration and or receive the UCI transmission from the UE.

As described herein, a UE may be configured to transmit UCI in a PUCCH resource in accordance with a number of slots or sub-slots greater than one (e.g., with repetition), where multiple beams have been activated for the PUCCH resource. As such, the UE is configured to transmit the UCI via the first beam 315-*a* and the second beam 315-*b* in the PUCCH resource in more than one slot, or sub-slot. The UE may be configured to do so in accordance with one or more transmission configurations such as inter-slot repetition, intra-slot repetition, or intra-PUCCH resource beam hopping with repetitions. The UE may be configured to transmit the UCI in accordance with intra-PUCCH resource beam hopping without repetitions if no repetitions are associated the PUCCH resource or PUCCH format.

FIG. 3A depicts a transmission configuration in which a UE transmits UCI via a first beam 315-*a* and second beam 315-*b* in accordance with inter-slot repetition. In inter-slot repetition, one PUCCH resource 310 in a first slot 305-*a* may carry UCI, and the same PUCCH resource 310 in another one or more slots 305 may carry a repetition of the UCI. For example, a UE may be configured to transmit UCI (e.g., a UCI message) in a PUCCH resource 310 in which two beams have been activated, a first beam 315-*a* and a second beam 315-*b*. The UE may also determine that the PUCCH resource 310 and/or the PUCCH format of the PUCCH resource 310 is associated with two slots (e.g., a number of repetitions equal to two). As such, the UE may transmit the UCI in PUCCH resource 310-*a* in slot 305-*b* via the first beam 315-*a* and transmit repeated UCI in the repeated PUCCH resource 310-*b* in slot 305-*b* via the second beam 315-*b*. The UCI transmitted in slot 305-*a* and slot 305-*b* may be the same, and the time and frequency resources of PUCCH resource 310-*a* and 310-*b* in the respective slots 305 may be the same. In some cases, the UE may be activated to perform inter-slot repetition based on a number of repetitions for a PUCCH resource 310 or PUCCH format being greater than one (e.g., a number of slots being greater than one) and based on receiving an indication that the PUCCH resource 310 carrying the UCI is activated with more than one beam 315. The number of repetitions may be configured in an RRC message or MAC-CE message, and the number of activated beams 315 for a PUCCH resource 310 may be indicated in a MAC-CE message. In some cases, the UE may be activated to perform inter-slot repetition based on an implicit or explicit indication to do so, or based on inter-slot repetition being a default configuration, as described with reference to FIG. 2.

FIG. 3B depicts a transmission configuration in which a UE transmits UCI via a first beam 315-*a* and second beam 315-*b* in accordance with intra-slot repetition. In intra-slot repetition, one PUCCH resource 310 in a first sub-slot 320-*a* may carry UCI, and the same PUCCH resource 310 in another one or more sub-slots 320 of a slot 305 (e.g., slot 305-*c*) may carry a repetition of the UCI. For example, a UE may be configured to transmit UCI (e.g., an UCI message) in a PUCCH resource 310 in which two beams have been activated, a first beam 315-*a* and a second beam 315-*b*. The UE may also determine that the PUCCH resource 310 and/or the PUCCH format of the PUCCH resource 310 is associated with two sub-slots (e.g., a number of repetitions equal to two). As such, the UE may transmit the UCI in PUCCH resource 310-*c* in sub-slot 320-*a* via the first beam 315-*a* and transmit repeated UCI in the repeated PUCCH resource 310-*d* in sub-slot 320-*b* via the second beam 315-*b*. The UCI transmitted in sub-slot 320-*a* and sub-slot 320-*b* may be the same, and the time and frequency resources of PUCCH resource 310-*c* and 310-*d* in the respective sub-slots 320 may be the same. In some cases, the UE may be activated to perform intra-slot repetition based on a number of repetitions for a PUCCH resource 310 or PUCCH format being greater than one (e.g., a number of sub-slots being greater than one) and based on receiving an indication that the PUCCH resource carrying the UCI is activated with more than one beam 315. The number of repetitions may be configured in an RRC message or MAC-CE message, and the number of activated beams 315 for a PUCCH resource 310 may be indicated in a MAC-CE message. In some cases, the UE may be activated to perform intra-slot repetition based on an implicit or explicit indication to do so, or based on intra-slot repetition being a default configuration, as described with reference to FIG. 2.

Figure 4A:
Figure 4A:
Figure 4A:
Figure 4A:
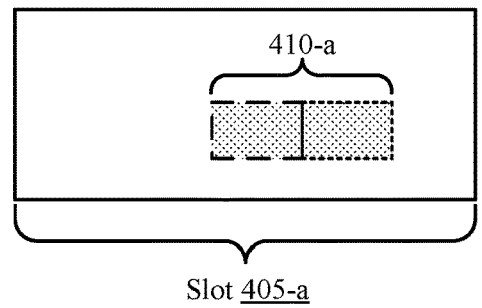
Figure 4B:
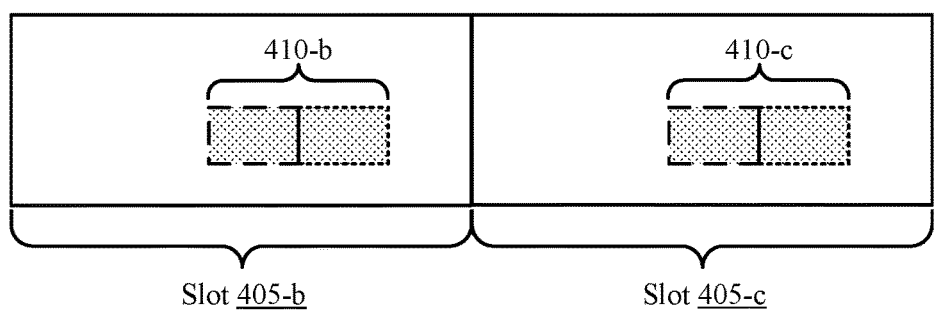

FIGS. 4A and 4B illustrate examples of transmission configurations 400 that support techniques for performing uplink control channel beam hopping and repetition in accordance with aspects of the present disclosure. The transmission configurations 400 and 401 may be implemented by a base station and a UE, which may be examples of a base station and a UE as described with reference to FIGS. 1 through 3B. In some cases, a UE may be configured to perform a UCI transmission procedure in which the UE may transmit UCI via one or more beams to one or more base stations. The UE may transmit the UCI in accordance with transmission configuration 400 or transmission configuration 401. Additionally or alternatively, other wireless devices, such as a base station may indicate a UCI transmission configuration and or receive the UCI transmission from the UE.

As described herein, a UE may be configured to transmit UCI in a PUCCH resource in accordance with a number of slots or sub-slots greater than one (e.g., with repetition), or with a number of slots or sub-slots equal to one (e.g., without repetition). In some cases, multiple beams have been activated for the PUCCH resource. As such, the UE is configured to transmit the UCI via the first beam 415-*a* and the second beam 415-*b* in the PUCCH resource in one slot, one sub-slot, more than one slot, or more than one sub-slot based on the number of repetitions. The UE may be configured to do so in accordance with one or more transmission configurations such as inter-slot repetition, intra-slot repetition, intra-PUCCH resource beam hopping with repetitions, or intra-PUCCH resource beam hopping without repetitions. The UE may be configured to transmit the UCI in accordance with intra-PUCCH resource beam hopping without repetitions, if no repetitions are associated the PUCCH resource or PUCCH format.

FIG. 4A depicts a transmission configuration in which a UE transmits UCI (e.g., a UCI message) via a first beam 415-*a* and second beam 415-*b* in accordance with intra-PUCCH resource beam hopping without repetitions. In intra-PUCCH resource beam hopping, UCI is transmitted in one PUCCH resource 410-*a* in a slot 405-*a* in which the PUCCH resource 410-*a* is divided into a first portion and second portion, the first portion and the second portion may include the same amount of time and frequency resources. In some cases, the first portion may include a first set of symbols of the PUCCH resource 410-*a* and the second portion may include a second set of symbols of the PUCCH resource 410-*a*, where the first set and the second set of symbols include the same or a similar number of symbols. The UE may be configured to transmit the UCI via the first beam 415-*a* in the first portion of the PUCCH resource 410-*a* and transmit UCI via the second beam 415-*b* in the second portion of the PUCCH resource 410-*a*. As the UE is transmitting the UCI via the first beam 415-*a* and the second beam 415-*b* in the same PUCCH resource 410-*a*, the UE may not be performing repetition. In some cases, the UE may be activated to perform intra-PUCCH resource beam hopping without repetition based on a number of repetitions for a PUCCH resource 410 or a PUCCH format being equal to one (e.g., a number of slots or sub-slots being equal one) and based on receiving an indication that the PUCCH resource 410 carrying the UCI is activated with more than one beam 415. The number of activated beams 415 for a PUCCH resource 410 may be indicated in a MAC-CE message. In some cases, the UE may be activated to perform intra-PUCCH resource beam hopping without repetition based on an implicit or explicit indication to do so, or based on intra-PUCCH resource beam hopping without repetition being a default configuration, as described with reference to FIG. 2.

FIG. 4B depicts a transmission configuration in which a UE transmits UCI (e.g., a UCI message) via a first beam 415-*a* and second beam 415-*b* in accordance with intra-PUCCH resource beam hopping with repetitions. Intra-PUCCH resource beam hopping may be a combination of intra-PUCCH resource beam hopping as described with reference to FIG. 4A, but repeated in multiple slots, or sub-slots. For example, a PUCCH resource 410-*b* in slot 405-*b* is divided into a first portion and second portion, the first portion and the second portion may include the same amount of time and frequency resources. In some cases, the first portion may include a first set of symbols of the PUCCH resource 410-*b* and the second portion may include a second set of symbols of the PUCCH resource 410-*b*, where the first set and the second set of symbols include the same or a similar number of symbols. The UE may be configured to transmit the UCI via the first beam 415-*a* in the first portion of the PUCCH resource 410-*b* and transmit UCI via the second beam 415-*b* in the second portion of the PUCCH resource 410-*b*. The UE may continue this configuration up to the configured number of configurations. For example, if the UE is configured with two slots, the UE may perform the same or similar configuration in a second slot. For example, a PUCCH resource 410-*c* in slot 405-*c* is divided into a first portion and second portion, where PUCCH resources 410-*b* and 410-*c* may include the same time and frequency resources within a slot 405. The first portions of PUCCH resources 410-*b* and 410-*c* may include the same or similar time and frequency resources and the second portions of PUCCH resources 410-*b* and 410-*c* may include the same or similar time and frequency resources. As was performed in slot 405-*a*, a UE may be configured to transmit the UCI via the first beam 415-*a* in the first portion of the PUCCH resource 410-*c* and transmit UCI via the second beam 415-*b* in the second portion of the PUCCH resource 410-*c*. As such, the UE may repeat the procedure performed in slot 405-*b* in slot 405-*c*.

In some cases, the UE may be activated to perform intra-PUCCH resource beam hopping with repetition based on a number of repetitions for a PUCCH resource 410 or a PUCCH format being greater than one (e.g., a number of slots or sub-slots being greater than one) and based on receiving an indication that the PUCCH resource 410 carrying the UCI is activated with more than one beam 415. The number of repetitions may be configured in an RRC message or MAC-CE message, and the number of activated beams 415 for a PUCCH resource 410 may be indicated in a MAC-CE message. In some cases, the UE may be activated to perform intra-PUCCH resource beam hopping with repetition based on an implicit or explicit indication to do so, or based on intra-PUCCH resource beam hopping with repetition being a default configuration, as described with reference to FIG. 2.

Figure 5:
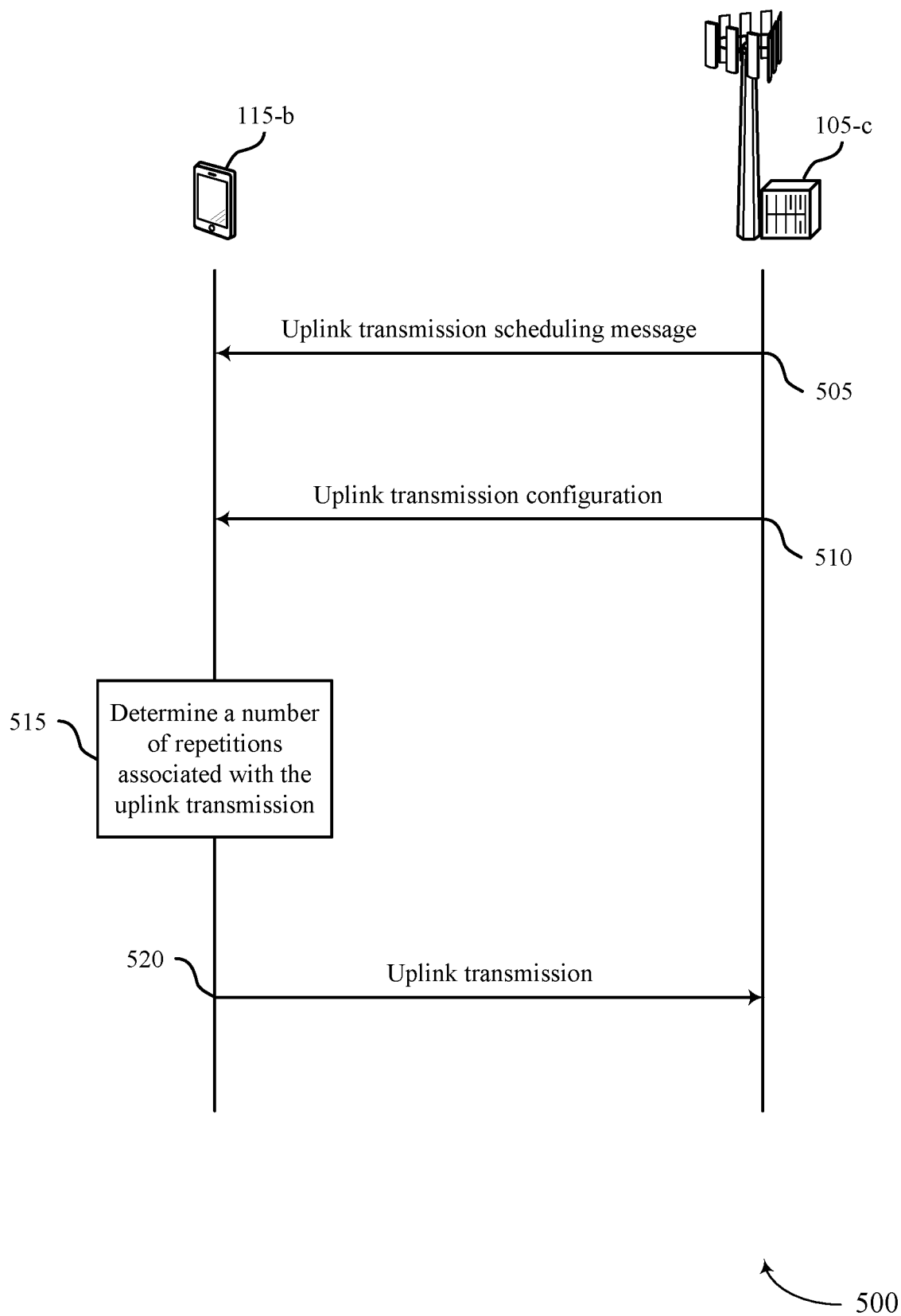
FIG. 5 illustrates an example of a process flow that supports techniques for performing uplink control channel beam hopping and repetition in accordance with aspects of the present disclosure.

FIG. 5 illustrates an example of a process flow 500 that supports techniques for performing uplink control channel beam hopping and repetition in accordance with aspects of the present disclosure. The process flow 500 may illustrate an example transmission configuration determination procedure. For example, UE 115-*b* may perform a transmission configuration determination procedure for transmitting an uplink transmission to one or more base stations 105. Base station 105-*c* and UE 115-*b* may be examples of the corresponding wireless devices described with reference to FIGS. 1 through 4B. In some cases, instead of UE 115-*b* implementing the configuration determination procedure, a different type of wireless device (e.g., a base station 105) may perform the procedure. Alternative examples of the following may be implemented, where some steps are performed in a different order than described or are not performed at all. In some cases, steps may include additional features not mentioned below, or further steps may be added.

At 505, UE 115-*b* may receive, from base station 105-*c*, a message scheduling transmission, by UE 115-*b*, of UCI in an uplink control channel resource (e.g., PUCCH resource).

At 510, UE 115-*b* may receive an indication that UE 115-*b* is scheduled to transmit the UCI via a first beam during the uplink control channel resource and via a second beam during the uplink control channel resource.

At 515, UE 115-*b* may determine a number of repetitions associated with transmitting the UCI.

At 520, UE 115-*b* may transmit the UCI via one of inter-slot repetition, intra-PUCCH resource beam hopping, or intra-slot repetition based on the number of repetitions.

In some cases, UE 115-*b* may receive a second message indicating the number of repetitions associated with transmitting the UCI, where the number of repetitions is greater than one. In some implementations, UE 115-*b* may receive a second message indicating that UE 115-*b* is scheduled to transmit the UCI via the first beam and the second beam according to intra-PUCCH resource beam hopping. The second message may be included in a MAC-CE, where transmitting the UCI via intra-PUCCH resource beam hopping is based on the second message and the number of repetitions being greater than one.

If UE 115-*b* receives a second message indicating the number of repetitions associated with transmitting the UCI, where the number of repetitions is greater than one, UE 115-*b* may determine to transmit the UCI via inter-slot repetition based on the number of repetitions being greater than one, transmit the UCI via the first beam during the uplink control channel resource in a first slot, and transmit the UCI via the second beam during the uplink control channel resource in a second slot, where the second slot is different than the first slot. In another case, UE 115-*b* may determine to transmit the UCI via intra-slot repetition based on the number of repetitions being greater than one, transmit the UCI via the first beam during the uplink control channel resource in a first sub-slot of a slot, and transmit the UCI via the second beam during the uplink control channel resource in a second sub-slot of the slot, where the second sub-slot is different than the first sub-slot.

In some cases, the number of repetitions may be equal to one, and UE 115-*b* may determine to transmit the UCI via intra-PUCCH resource beam hopping based on the number of repetitions being equal to one, transmit the UCI via the first beam during a first portion (e.g., a first set of slots) of the uplink control channel resource in a slot, and transmit the UCI via the second beam during a second portion (e.g., a second set of slots) of the uplink control channel resource in the slot, where the second portion is different than the first portion.

In some cases, UE 115-*b* may monitor for a second message indicating that UE 115-*b* is enabled to perform intra-PUCCH resource beam hopping. UE 115-*b* may receive the second message indicating that UE 115-*b* is enabled to perform intra-PUCCH resource beam hopping, where transmitting the UCI via intra-PUCCH resource beam hopping is based on the second message and the number of repetitions being greater than one. In some cases, UE 115-*b* may transmit the UCI via inter-slot repetition or intra-slot repetition based on not receiving the second message.

In some implementations, UE 115-*b* may receive a second message indicating a first set of UCI types and a second set of UCI types. The second message may indicate that the first set is associated with intra-PUCCH resource beam hopping and that the second set is associated with inter-slot repetition or intra-slot repetition. UE 115-*b* may determine that the UCI is in the first set of UCI types, and transmit the UCI via intra-PUCCH resource beam hopping based on the UCI being in the first set and the number of repetitions being greater than one. UE 115-*b* may determine that the UCI is in the second set of UCI types, and transmit the UCI via inter-slot repetition or intra-slot repetition based on the UCI being in the second set.

In some cases, UE 115-*b* may determine that a payload of the UCI is greater than a threshold payload size, and transmit the UCI via intra-PUCCH resource beam hopping based on the payload of the UCI being greater than the threshold payload size and the number of repetitions being greater than one. In some cases, UE 115-*b* may determine that a payload of the UCI is less than a threshold payload size, and transmit the UCI via inter-slot repetition or intra-slot repetition based on the payload of the UCI being less than the threshold payload size.

In some implementations, UE 115-*b* may monitor for a second message indicating that the UE is enabled to perform intra-PUCCH resource beam hopping or indicating the number of repetitions associated with transmitting the UCI, and transmit the UCI via the first beam without repetition based on not receiving the second message.

In some implementations, UE 115-*b* may monitor for a second message indicating that UE 115-*b* is enabled to perform intra-PUCCH resource beam hopping or indicating the number of repetitions associated with transmitting the UCI. UE 115-*b* may determine the number of repetitions associated with transmitting the UCI is equal to a default number of repetitions based on not receiving the second message, and transmit the UCI via inter-slot repetition or intra-slot repetition in accordance with the default number of repetitions.

In some implementations, UE 115-*b* may monitor for a second message indicating that UE 115-*b* is enabled to perform intra-PUCCH resource beam hopping or indicating the number of repetitions associated with transmitting the UCI, transmit the UCI via intra-PUCCH resource beam hopping based on not receiving the second message.

Figure 6:
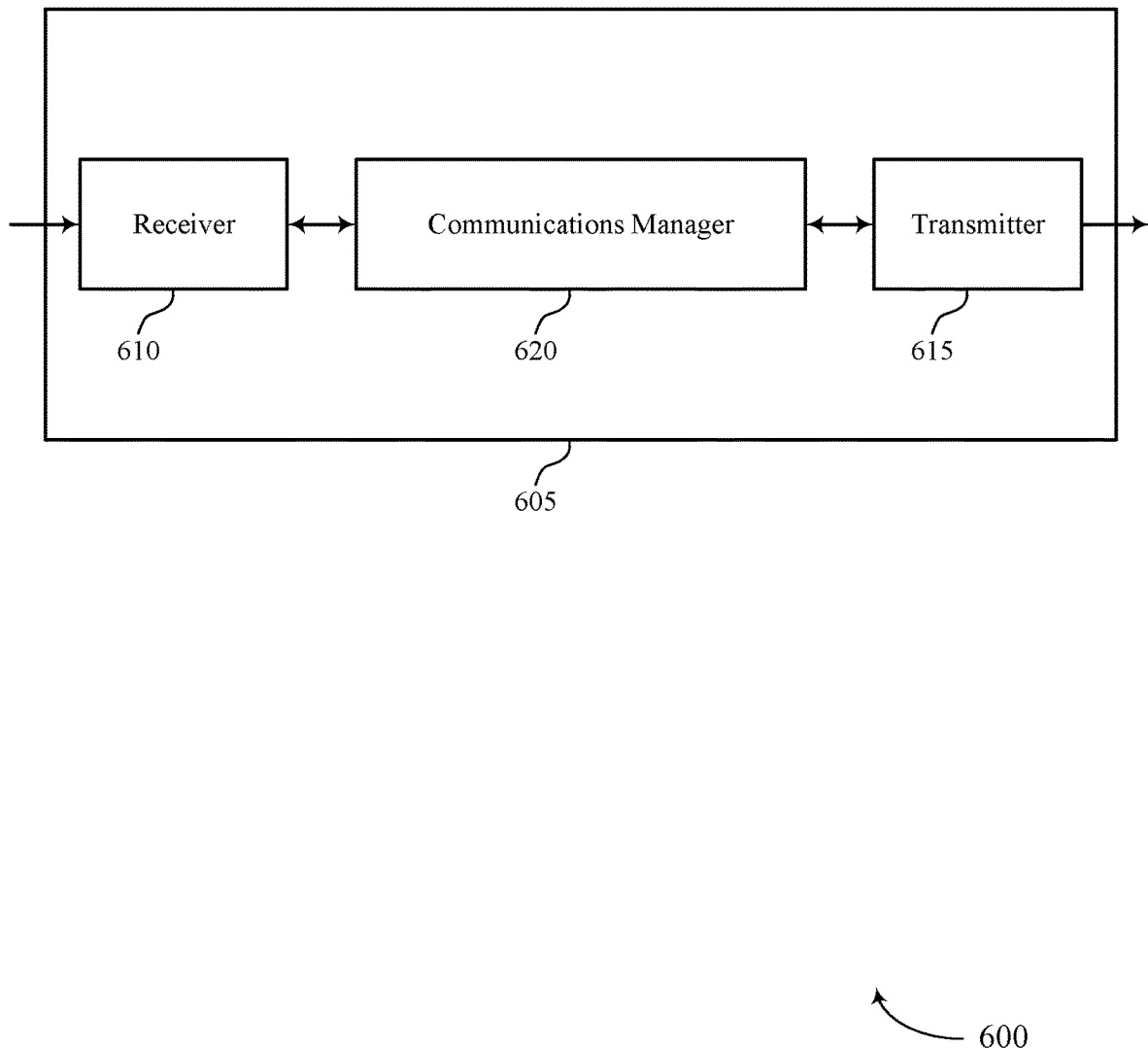
FIGS. 6 and 7 show block diagrams of devices that support techniques for performing uplink control channel beam hopping and repetition in accordance with aspects of the present disclosure.

FIG. 6 shows a block diagram 600 of a device 605 that supports techniques for performing uplink control channel beam hopping and repetition in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing uplink control channel beam hopping and repetition). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing uplink control channel beam hopping and repetition). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for performing uplink control channel beam hopping and repetition as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software) executed by a processor. If implemented in code executed by a processor, the functions of the communications manager 620, the receiver 610, the transmitter 615, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, a message scheduling transmission, by the UE, of UCI in an uplink control channel resource. The communications manager 620 may be configured as or otherwise support a means for receiving an indication that the UE is scheduled to transmit the UCI via a first beam during the uplink control channel resource and via a second beam during the uplink control channel resource. The communications manager 620 may be configured as or otherwise support a means for determining a number of repetitions associated with transmitting the UCI. The communications manager 620 may be configured as or otherwise support a means for transmitting the UCI via one of inter-slot repetition, intra-uplink control channel resource beam hopping, or intra-slot repetition based on the number of repetitions.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources.

Figure 7:
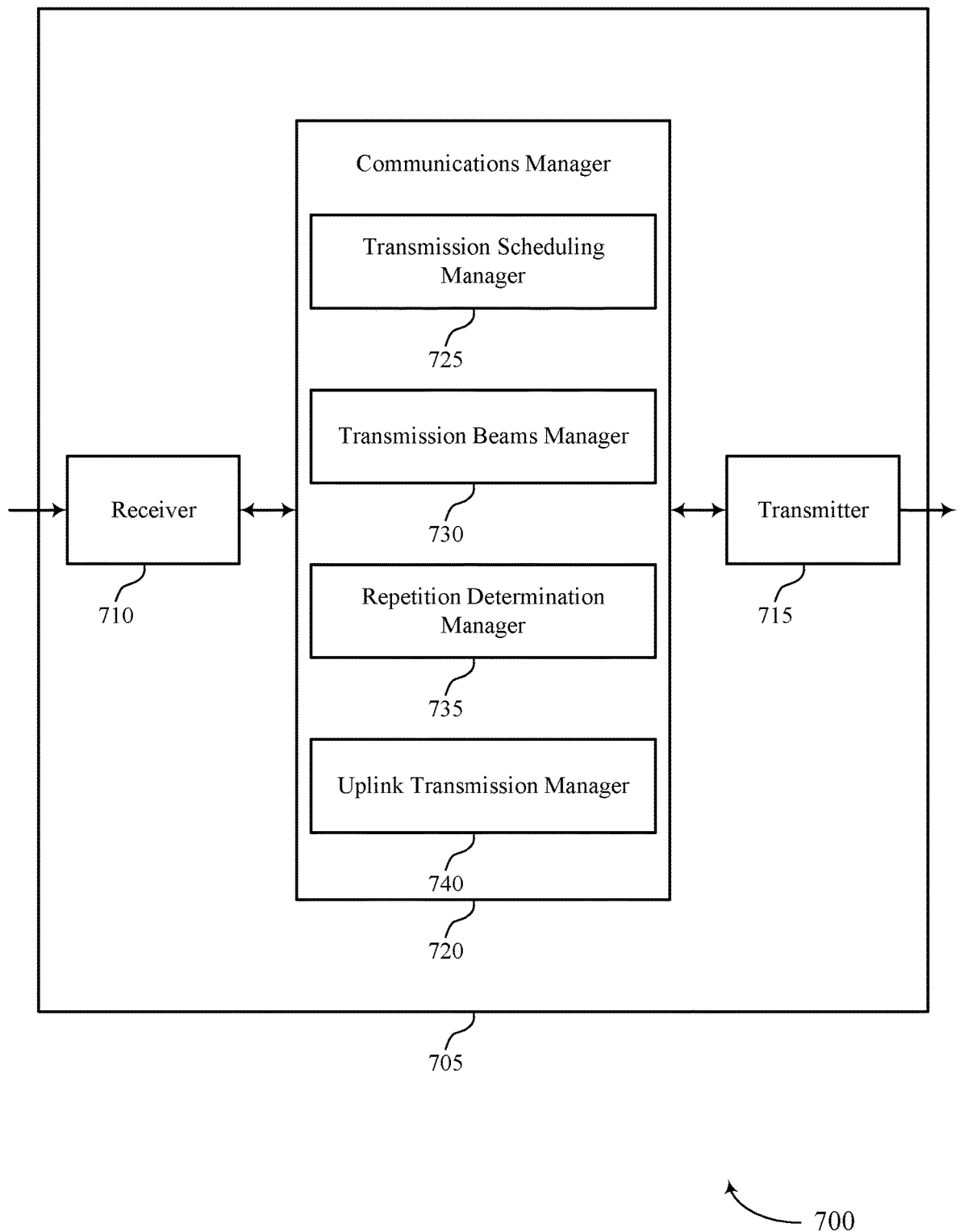

FIG. 7 shows a block diagram 700 of a device 705 that supports techniques for performing uplink control channel beam hopping and repetition in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for performing uplink control channel beam hopping and repetition). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for performing uplink control channel beam hopping and repetition). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for performing uplink control channel beam hopping and repetition as described herein. For example, the communications manager 720 may include a transmission scheduling manager 725, a transmission beams manager 730, a repetition determination manager 735, an uplink transmission manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The transmission scheduling manager 725 may be configured as or otherwise support a means for receiving, from a base station, a message scheduling transmission, by the UE, of UCI in an uplink control channel resource. The transmission beams manager 730 may be configured as or otherwise support a means for receiving an indication that the UE is scheduled to transmit the UCI via a first beam during the uplink control channel resource and via a second beam during the uplink control channel resource. The repetition determination manager 735 may be configured as or otherwise support a means for determining a number of repetitions associated with transmitting the UCI. The uplink transmission manager 740 may be configured as or otherwise support a means for transmitting the UCI via one of inter-slot repetition, intra-uplink control channel resource beam hopping, or intra-slot repetition based on the number of repetitions.

Figure 8:
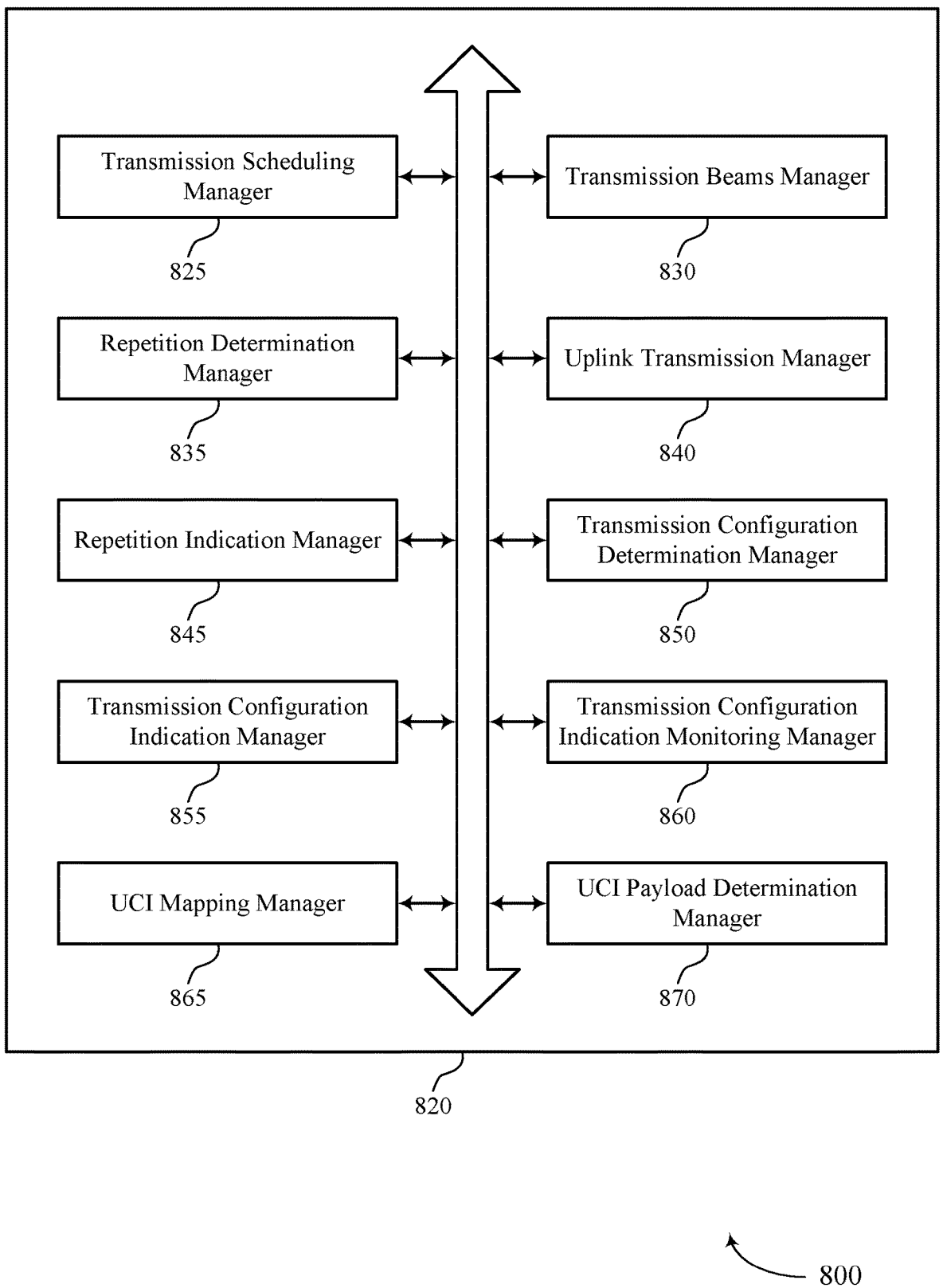
FIG. 8 shows a block diagram of a communications manager that supports techniques for performing uplink control channel beam hopping and repetition in accordance with aspects of the present disclosure.

FIG. 8 shows a block diagram 800 of a communications manager 820 that supports techniques for performing uplink control channel beam hopping and repetition in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for performing uplink control channel beam hopping and repetition as described herein. For example, the communications manager 820 may include a transmission scheduling manager 825, a transmission beams manager 830, a repetition determination manager 835, an uplink transmission manager 840, a repetition indication manager 845, a transmission configuration determination manager 850, a transmission configuration indication manager 855, a transmission configuration indication monitoring manager 860, a UCI mapping manager 865, a UCI payload determination manager 870, or any combination thereof. Each of these components may communicate, directly or indirectly, with one another (e.g., via one or more buses).

The communications manager 820 may support wireless communications at a UE in accordance with examples as disclosed herein. The transmission scheduling manager 825 may be configured as or otherwise support a means for receiving, from a base station, a message scheduling transmission, by the UE, of UCI in an uplink control channel resource. The transmission beams manager 830 may be configured as or otherwise support a means for receiving an indication that the UE is scheduled to transmit the UCI via a first beam during the uplink control channel resource and via a second beam during the uplink control channel resource. The repetition determination manager 835 may be configured as or otherwise support a means for determining a number of repetitions associated with transmitting the UCI. The uplink transmission manager 840 may be configured as or otherwise support a means for transmitting the UCI via one of inter-slot repetition, intra-uplink control channel resource beam hopping, or intra-slot repetition based on the number of repetitions.

In some examples, to support determining the number of repetitions, the repetition indication manager 845 may be configured as or otherwise support a means for receiving a second message indicating the number of repetitions associated with transmitting the UCI, the number of repetitions greater than one.

In some examples, to support transmitting the UCI, the transmission configuration determination manager 850 may be configured as or otherwise support a means for determining to transmit the UCI via inter-slot repetition based on the number of repetitions being greater than one. In some examples, to support transmitting the UCI, the uplink transmission manager 840 may be configured as or otherwise support a means for transmitting the UCI via the first beam during the uplink control channel resource in a first slot. In some examples, to support transmitting the UCI, the uplink transmission manager 840 may be configured as or otherwise support a means for transmitting the UCI via the second beam during the uplink control channel resource in a second slot, the second slot different than the first slot.

In some examples, to support transmitting the UCI, the transmission configuration determination manager 850 may be configured as or otherwise support a means for determining to transmit the UCI via intra-slot repetition based on the number of repetitions being greater than one. In some examples, to support transmitting the UCI, the uplink transmission manager 840 may be configured as or otherwise support a means for transmitting the UCI via the first beam during the uplink control channel resource in a first sub-slot of a slot. In some examples, to support transmitting the UCI, the uplink transmission manager 840 may be configured as or otherwise support a means for transmitting the UCI via the second beam during the uplink control channel resource in a second sub-slot of the slot, the second sub-slot different than the first sub-slot.

In some examples, the number of repetitions is equal to one repetition and, to support transmitting the UCI, the transmission configuration determination manager 850 may be configured as or otherwise support a means for determining to transmit the UCI via intra-uplink control channel resource beam hopping based on the number of repetitions being equal to one. In some examples, the number of repetitions is equal to one repetition and, to support transmitting the UCI, the uplink transmission manager 840 may be configured as or otherwise support a means for transmitting the UCI via the first beam during a first set of symbols of the uplink control channel resource. In some examples, the number of repetitions is equal to one repetition and, to support transmitting the UCI, the uplink transmission manager 840 may be configured as or otherwise support a means for transmitting the UCI via the second beam during a second set of symbols of the uplink control channel resource, the second set of symbols different than the first set of symbols.

In some examples, the transmission configuration indication manager 855 may be configured as or otherwise support a means for receiving a second message indicating that the UE is scheduled to transmit the UCI via the first beam and the second beam according to intra-uplink control channel resource beam hopping, the second message included in a MAC-CE, where transmitting the UCI via intra-uplink control channel resource beam hopping is based on the second message and the number of repetitions being greater than one.

In some examples, the transmission configuration indication monitoring manager 860 may be configured as or otherwise support a means for monitoring for a second message indicating that the UE is enabled to perform intra-uplink control channel resource beam hopping.

In some examples, the transmission configuration indication manager 855 may be configured as or otherwise support a means for receiving the second message indicating that the UE is enabled to perform intra-uplink control channel resource beam hopping, where transmitting the UCI via intra-uplink control channel resource beam hopping is based on the second message and the number of repetitions being greater than one.

In some examples, to support transmitting the UCI, the uplink transmission manager 840 may be configured as or otherwise support a means for transmitting the UCI via inter-slot repetition or intra-slot repetition based on not receiving the second message.

In some examples, the UCI mapping manager 865 may be configured as or otherwise support a means for receiving a second message indicating a first set of UCI types and a second set of UCI types, the second message indicating that the first set of UCI types is associated with intra-uplink control channel resource beam hopping and that the second set of UCI types is associated with inter-slot repetition or intra-slot repetition.

In some examples, the transmission configuration determination manager 850 may be configured as or otherwise support a means for determining that the UCI is in the first set of UCI types. In some examples, the uplink transmission manager 840 may be configured as or otherwise support a means for transmitting the UCI via intra-uplink control channel resource beam hopping based on the UCI being in the first set of UCI types and the number of repetitions being greater than one.

In some examples, the transmission configuration determination manager 850 may be configured as or otherwise support a means for determining that the UCI is in the second set of UCI types. In some examples, the uplink transmission manager 840 may be configured as or otherwise support a means for transmitting the UCI via inter-slot repetition or intra-slot repetition based on the UCI being in the second set of UCI types.

In some examples, the UCI payload determination manager 870 may be configured as or otherwise support a means for determining that a payload of the UCI is greater than a threshold payload size. In some examples, the uplink transmission manager 840 may be configured as or otherwise support a means for transmitting the UCI via intra-uplink control channel resource beam hopping based on the payload of the UCI being greater than the threshold payload size and the number of repetitions being greater than one.

In some examples, the UCI payload determination manager 870 may be configured as or otherwise support a means for determining that a payload of the UCI is less than a threshold payload size. In some examples, the uplink transmission manager 840 may be configured as or otherwise support a means for transmitting the UCI via inter-slot repetition or intra-slot repetition based on the payload of the UCI being less than the threshold payload size.

In some examples, the transmission configuration indication monitoring manager 860 may be configured as or otherwise support a means for monitoring for a second message indicating that the UE is enabled to perform intra-uplink control channel resource beam hopping or indicating the number of repetitions associated with transmitting the UCI. In some examples, the uplink transmission manager 840 may be configured as or otherwise support a means for transmitting the UCI via the first beam without repetition based on not receiving the second message.

In some examples, the transmission configuration indication monitoring manager 860 may be configured as or otherwise support a means for monitoring for a second message indicating that the UE is enabled to perform intra-uplink control channel resource beam hopping or indicating the number of repetitions associated with transmitting the UCI. In some examples, the repetition determination manager 835 may be configured as or otherwise support a means for determining the number of repetitions associated with transmitting the UCI is equal to a default number of repetitions based on not receiving the second message. In some examples, the uplink transmission manager 840 may be configured as or otherwise support a means for transmitting the UCI via inter-slot repetition or intra-slot repetition in accordance with the default number of repetitions.

In some examples, the transmission configuration indication monitoring manager 860 may be configured as or otherwise support a means for monitoring for a second message indicating that the UE is enabled to perform intra-uplink control channel resource beam hopping or indicating the number of repetitions associated with transmitting the UCI. In some examples, the uplink transmission manager 840 may be configured as or otherwise support a means for transmitting the UCI via intra-uplink control channel resource beam hopping based on not receiving the second message.

Figure 9:
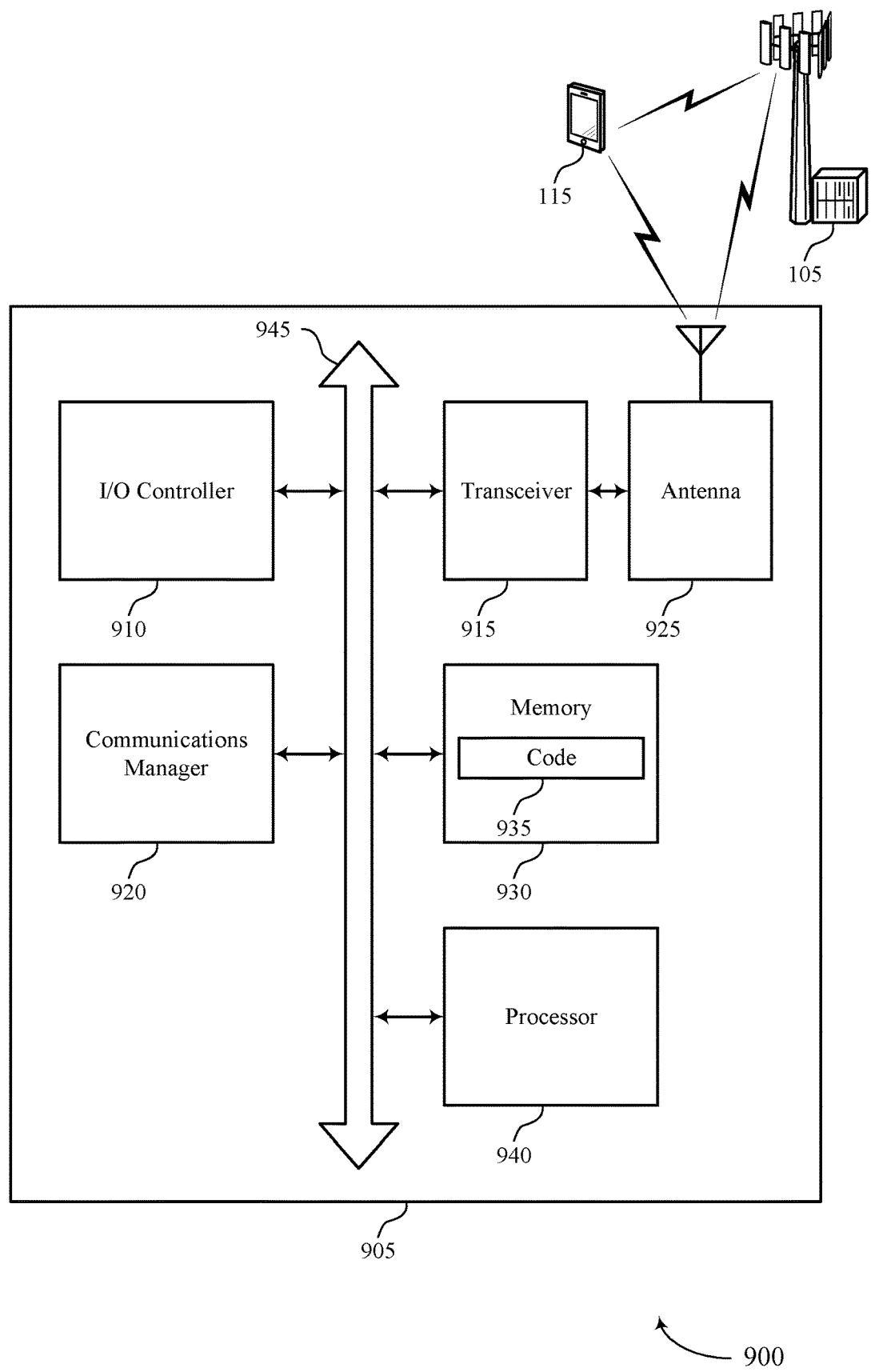
FIG. 9 shows a diagram of a system including a device that supports techniques for performing uplink control channel beam hopping and repetition in accordance with aspects of the present disclosure.

FIG. 9 shows a diagram of a system 900 including a device 905 that supports techniques for performing uplink control channel beam hopping and repetition in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for performing uplink control channel beam hopping and repetition). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, a message scheduling transmission, by the UE, of UCI in an uplink control channel resource. The communications manager 920 may be configured as or otherwise support a means for receiving an indication that the UE is scheduled to transmit the UCI via a first beam during the uplink control channel resource and via a second beam during the uplink control channel resource. The communications manager 920 may be configured as or otherwise support a means for determining a number of repetitions associated with transmitting the UCI. The communications manager 920 may be configured as or otherwise support a means for transmitting the UCI via one of inter-slot repetition, intra-uplink control channel resource beam hopping, or intra-slot repetition based on the number of repetitions.

By including or configuring the communications manager 920 in accordance with examples as described herein, the device 905 may support techniques for improved communication reliability, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for performing uplink control channel beam hopping and repetition as described herein, or the processor 940 and the memory 930 may be otherwise configured to perform or support such operations.

Figure 10:
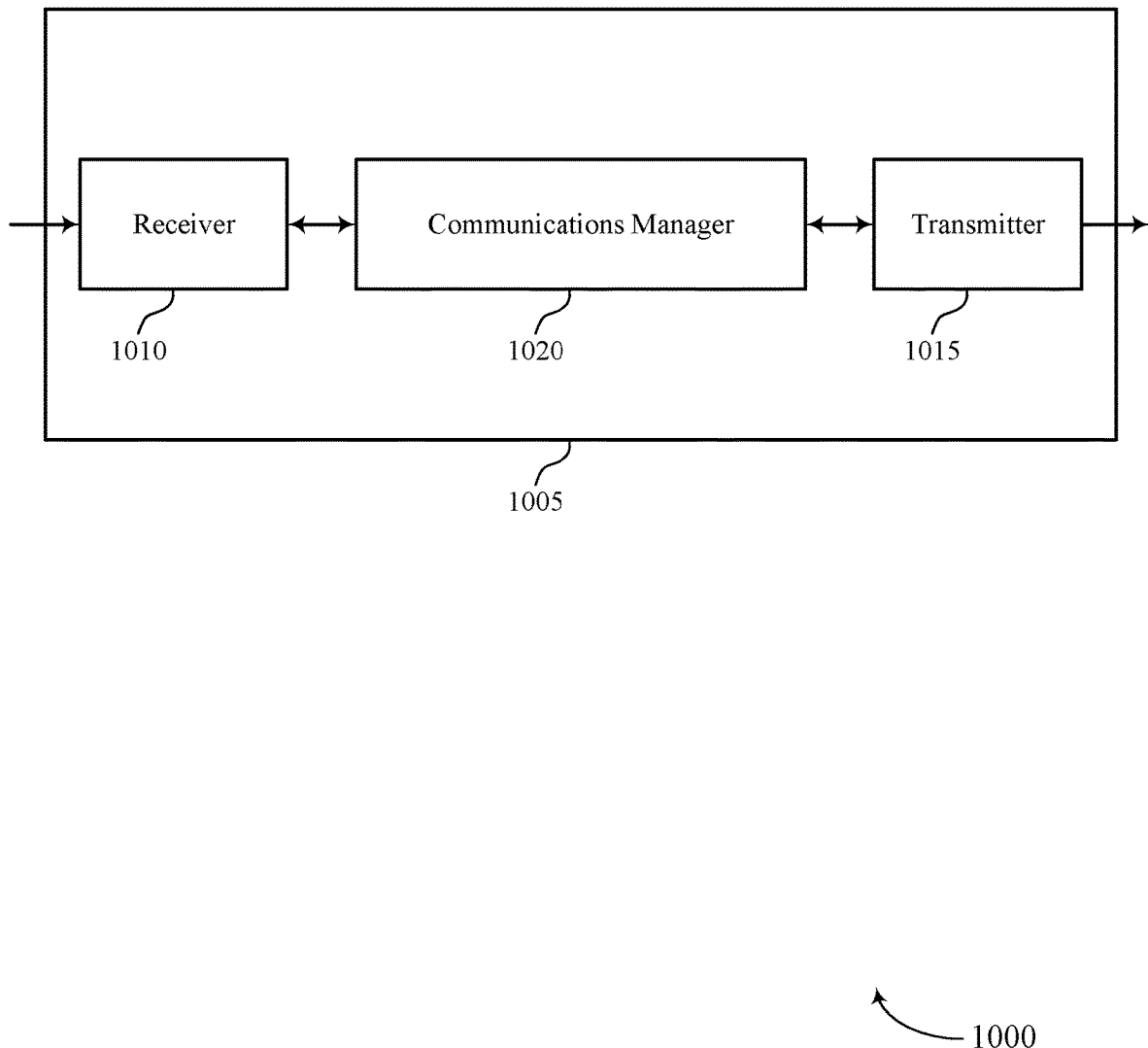
FIGS. 10 and 11 show block diagrams of devices that support techniques for performing uplink control channel beam hopping and repetition in accordance with aspects of the present disclosure.

FIG. 10 shows a block diagram 1000 of a device 1005 that supports techniques for performing uplink control channel beam hopping and repetition in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for performing uplink control channel beam hopping and repetition). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for performing uplink control channel beam hopping and repetition). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for performing uplink control channel beam hopping and repetition as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software) executed by a processor. If implemented in code executed by a processor, the functions of the communications manager 1020, the receiver 1010, the transmitter 1015, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, a message scheduling transmission, by the UE, of UCI in an uplink control channel resource. The communications manager 1020 may be configured as or otherwise support a means for transmitting an indication that the UE is scheduled to transmit the UCI via a first beam during the uplink control channel resource and via a second beam during the uplink control channel resource. The communications manager 1020 may be configured as or otherwise support a means for receiving the UCI via one of inter-slot repetition, intra-uplink control channel resource beam hopping, or intra-slot repetition based on a number of repetitions.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
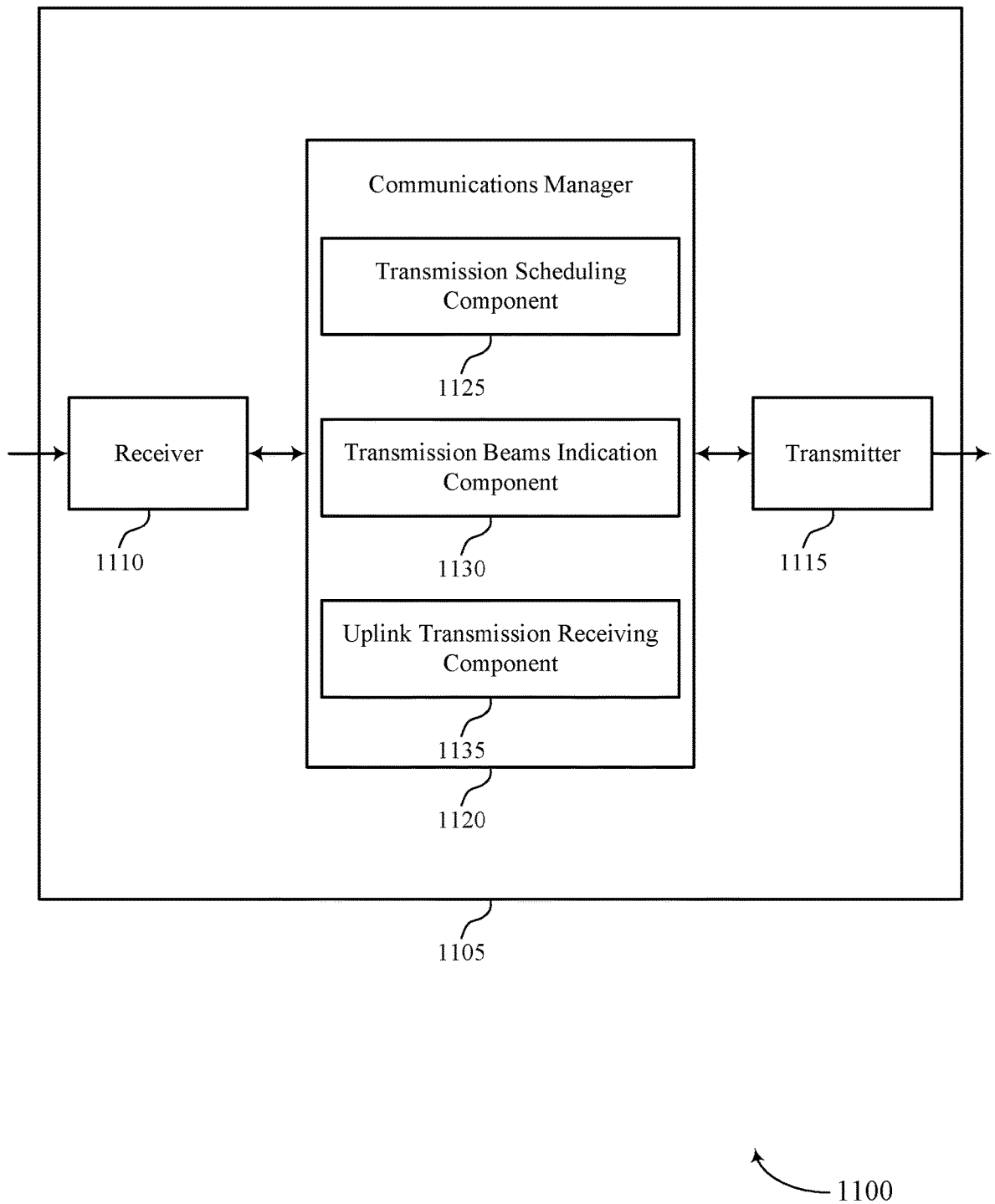

FIG. 11 shows a block diagram 1100 of a device 1105 that supports techniques for performing uplink control channel beam hopping and repetition in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for performing uplink control channel beam hopping and repetition). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for performing uplink control channel beam hopping and repetition). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for performing uplink control channel beam hopping and repetition as described herein. For example, the communications manager 1120 may include a transmission scheduling component 1125, a transmission beams indication component 1130, an uplink transmission receiving component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The transmission scheduling component 1125 may be configured as or otherwise support a means for transmitting, to a UE, a message scheduling transmission, by the UE, of UCI in an uplink control channel resource. The transmission beams indication component 1130 may be configured as or otherwise support a means for transmitting an indication that the UE is scheduled to transmit the UCI via a first beam during the uplink control channel resource and via a second beam during the uplink control channel resource. The uplink transmission receiving component 1135 may be configured as or otherwise support a means for receiving the UCI via one of inter-slot repetition, intra-uplink control channel resource beam hopping, or intra-slot repetition based on a number of repetitions.

Figure 12:
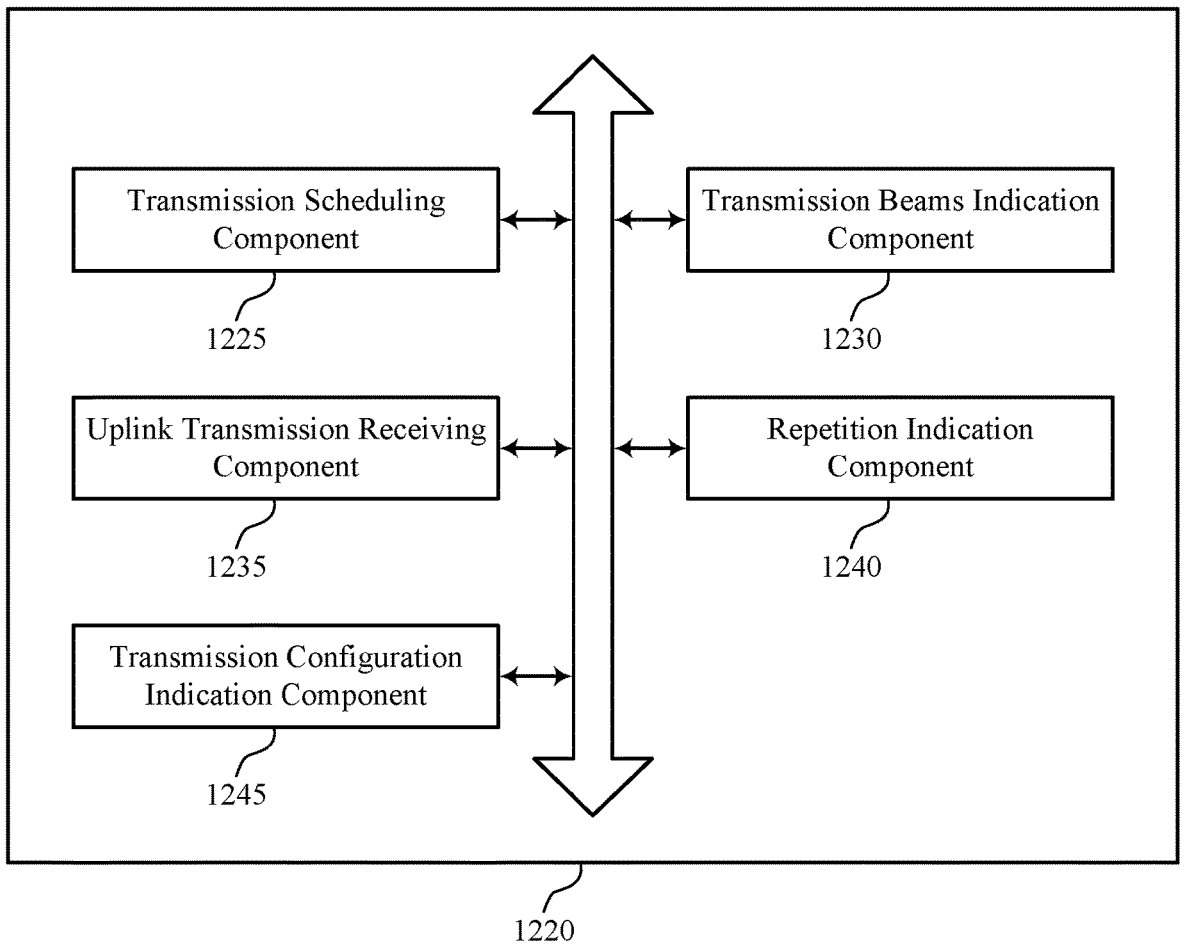
FIG. 12 shows a block diagram of a communications manager that supports techniques for performing uplink control channel beam hopping and repetition in accordance with aspects of the present disclosure.

FIG. 12 shows a block diagram 1200 of a communications manager 1220 that supports techniques for performing uplink control channel beam hopping and repetition in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for performing uplink control channel beam hopping and repetition as described herein. For example, the communications manager 1220 may include a transmission scheduling component 1225, a transmission beams indication component 1230, an uplink transmission receiving component 1235, a repetition indication component 1240, a transmission configuration indication component 1245, or any combination thereof. Each of these components may communicate, directly or indirectly, with one another (e.g., via one or more buses).

The communications manager 1220 may support wireless communications at a base station in accordance with examples as disclosed herein. The transmission scheduling component 1225 may be configured as or otherwise support a means for transmitting, to a UE, a message scheduling transmission, by the UE, of UCI in an uplink control channel resource. The transmission beams indication component 1230 may be configured as or otherwise support a means for transmitting an indication that the UE is scheduled to transmit the UCI via a first beam during the uplink control channel resource and via a second beam during the uplink control channel resource. The uplink transmission receiving component 1235 may be configured as or otherwise support a means for receiving the UCI via one of inter-slot repetition, intra-uplink control channel resource beam hopping, or intra-slot repetition based on a number of repetitions.

In some examples, the repetition indication component 1240 may be configured as or otherwise support a means for transmitting a second message indicating the number of repetitions associated with transmitting the UCI, the number of repetitions greater than one.

In some examples, to support receiving the UCI, the uplink transmission receiving component 1235 may be configured as or otherwise support a means for receiving the UCI via the first beam during the uplink control channel resource in a first slot based on the number of repetitions being greater than one. In some examples, to support receiving the UCI, the uplink transmission receiving component 1235 may be configured as or otherwise support a means for receiving the UCI via the second beam during the uplink control channel resource in a second slot based on the number of repetitions being greater than one, the second slot different than the first slot.

In some examples, to support receiving the UCI, the uplink transmission receiving component 1235 may be configured as or otherwise support a means for receiving the UCI via the first beam during the uplink control channel resource in a first sub-slot of a slot based on the number of repetitions being greater than one. In some examples, to support receiving the UCI, the uplink transmission receiving component 1235 may be configured as or otherwise support a means for receiving the UCI via the second beam during the uplink control channel resource in a second sub-slot of the slot based on the number of repetitions being greater than one, the second sub-slot different than the first sub-slot.

In some examples, to support receiving the UCI, the uplink transmission receiving component 1235 may be configured as or otherwise support a means for receiving the UCI via the first beam during a first set of symbols of the uplink control channel resource based on the number of repetitions associated with receiving the UCI being equal to one. In some examples, to support receiving the UCI, the uplink transmission receiving component 1235 may be configured as or otherwise support a means for receiving the UCI via the second beam during a second set of symbols of the uplink control channel resource, the second set of symbols different than the first set of symbols based on the number of repetitions associated with receiving the UCI being equal to one.

In some examples, the transmission configuration indication component 1245 may be configured as or otherwise support a means for transmitting a second message indicating that the UE is scheduled to transmit the UCI via the first beam and the second beam according to intra-uplink control channel resource beam hopping, the second message included in a MAC-CE, where receiving the UCI via intra-uplink control channel resource beam hopping is based on the second message and the number of repetitions being greater than one.

In some examples, the transmission configuration indication component 1245 may be configured as or otherwise support a means for transmitting a second message indicating that the UE is enabled to perform intra-uplink control channel resource beam hopping, where receiving the UCI via intra-uplink control channel resource beam hopping is based on the second message and the number of repetitions being greater than one.

In some examples, the transmission configuration indication component 1245 may be configured as or otherwise support a means for transmitting a second message indicating a first set of UCI types and a second set of UCI types, the second message indicating that the first set of UCI types is associated with intra-uplink control channel resource beam hopping and that the second set of UCI types is associated with inter-slot repetition or intra-slot repetition.

In some examples, the uplink transmission receiving component 1235 may be configured as or otherwise support a means for receiving the UCI via intra-uplink control channel resource beam hopping based on the UCI being in the first set of UCI types and the number of repetitions being greater than one.

In some examples, the uplink transmission receiving component 1235 may be configured as or otherwise support a means for receiving the UCI via inter-slot repetition or intra-slot repetition based on the UCI being in the second set of UCI types.

In some examples, the uplink transmission receiving component 1235 may be configured as or otherwise support a means for receiving the UCI via intra-uplink control channel resource beam hopping based on a payload of the UCI being greater than a threshold and the number of repetitions being greater than one.

In some examples, the uplink transmission receiving component 1235 may be configured as or otherwise support a means for receiving the UCI via inter-slot repetition or intra-slot repetition based on a payload of the UCI being less than a threshold.

In some examples, the uplink transmission receiving component 1235 may be configured as or otherwise support a means for receiving the UCI via inter-slot repetition or intra-slot repetition in accordance with a default number of repetitions.

Figure 13:
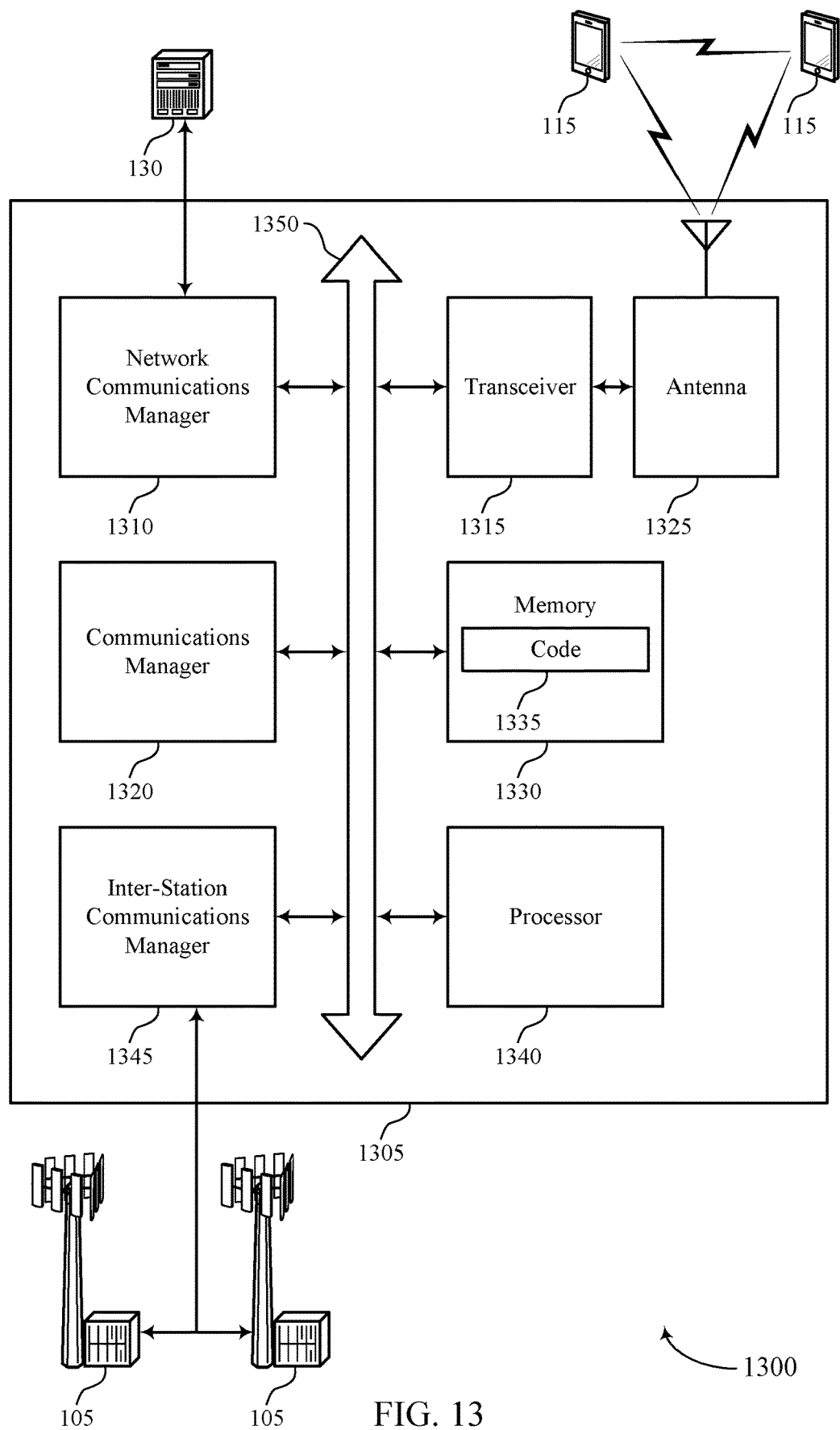
FIG. 13 shows a diagram of a system including a device that supports techniques for performing uplink control channel beam hopping and repetition in accordance with aspects of the present disclosure.

FIG. 13 shows a diagram of a system 1300 including a device 1305 that supports techniques for performing uplink control channel beam hopping and repetition in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for performing uplink control channel beam hopping and repetition). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, a message scheduling transmission, by the UE, of UCI in an uplink control channel resource. The communications manager 1320 may be configured as or otherwise support a means for transmitting an indication that the UE is scheduled to transmit the UCI via a first beam during the uplink control channel resource and via a second beam during the uplink control channel resource. The communications manager 1320 may be configured as or otherwise support a means for receiving the UCI via one of inter-slot repetition, intra-uplink control channel resource beam hopping, or intra-slot repetition based on a number of repetitions.

By including or configuring the communications manager 1320 in accordance with examples as described herein, the device 1305 may support techniques for improved communication reliability, more efficient utilization of communication resources, and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for performing uplink control channel beam hopping and repetition as described herein, or the processor 1340 and the memory 1330 may be otherwise configured to perform or support such operations.

Figure 14:
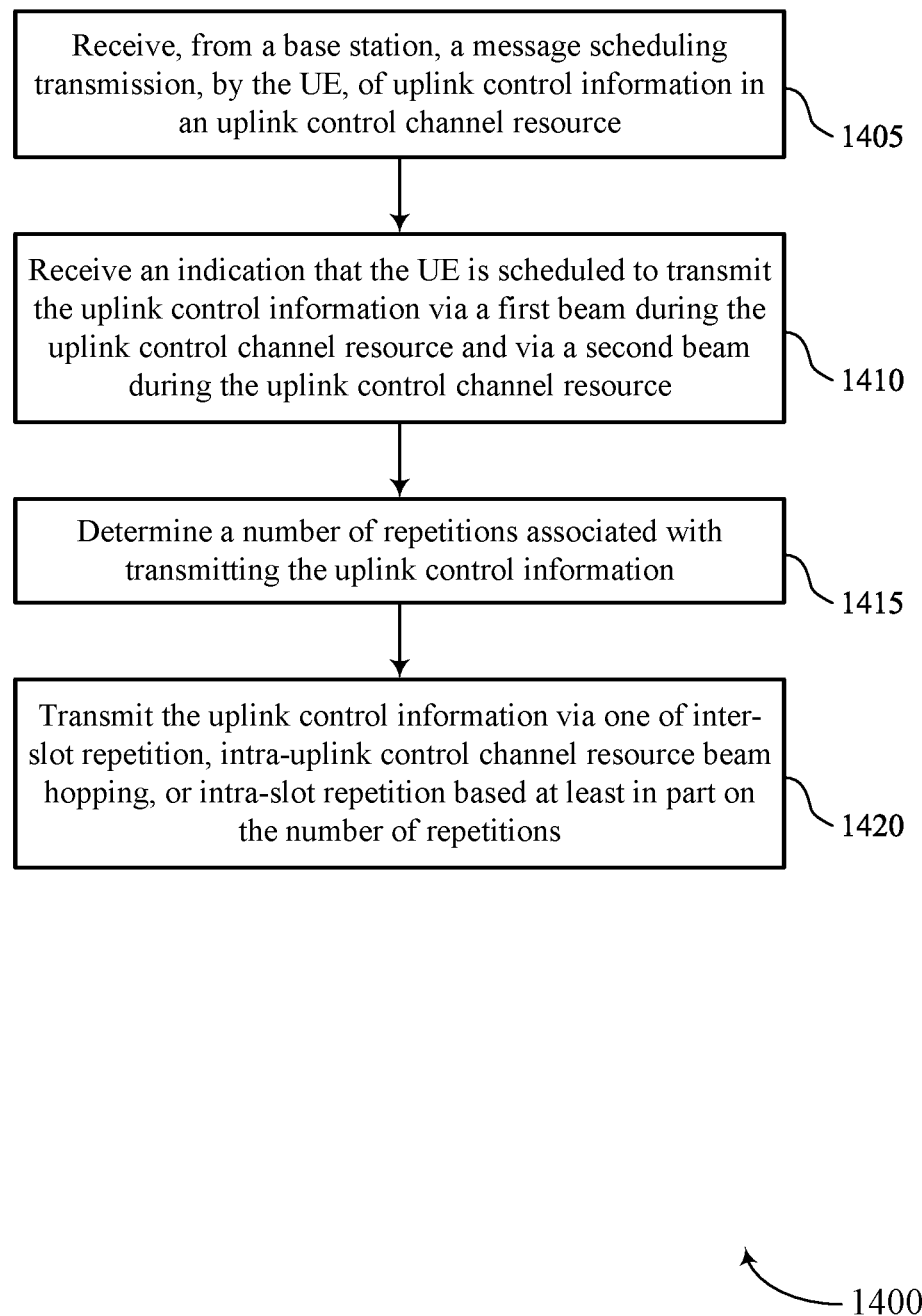
FIGS. 14 through 17 show flowcharts illustrating methods that support techniques for performing uplink control channel beam hopping and repetition in accordance with aspects of the present disclosure.

FIG. 14 shows a flowchart illustrating a method 1400 that supports techniques for performing uplink control channel beam hopping and repetition in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a message scheduling transmission, by the UE, of UCI in an uplink control channel resource. The operations of 1405 may be performed in accordance with examples as disclosed herein. In some examples, aspects of the operations of 1405 may be performed by a transmission scheduling manager 825 as described with reference to FIG. 8.

At 1410, the method may include receiving an indication that the UE is scheduled to transmit the UCI via a first beam during the uplink control channel resource and via a second beam during the uplink control channel resource. The operations of 1410 may be performed in accordance with examples as disclosed herein. In some examples, aspects of the operations of 1410 may be performed by a transmission beams manager 830 as described with reference to FIG. 8.

At 1415, the method may include determining a number of repetitions associated with transmitting the UCI. The operations of 1415 may be performed in accordance with examples as disclosed herein. In some examples, aspects of the operations of 1415 may be performed by a repetition determination manager 835 as described with reference to FIG. 8.

At 1420, the method may include transmitting the UCI via one of inter-slot repetition, intra-uplink control channel resource beam hopping, or intra-slot repetition based on the number of repetitions. The operations of 1420 may be performed in accordance with examples as disclosed herein. In some examples, aspects of the operations of 1420 may be performed by an uplink transmission manager 840 as described with reference to FIG. 8.

Figure 15:
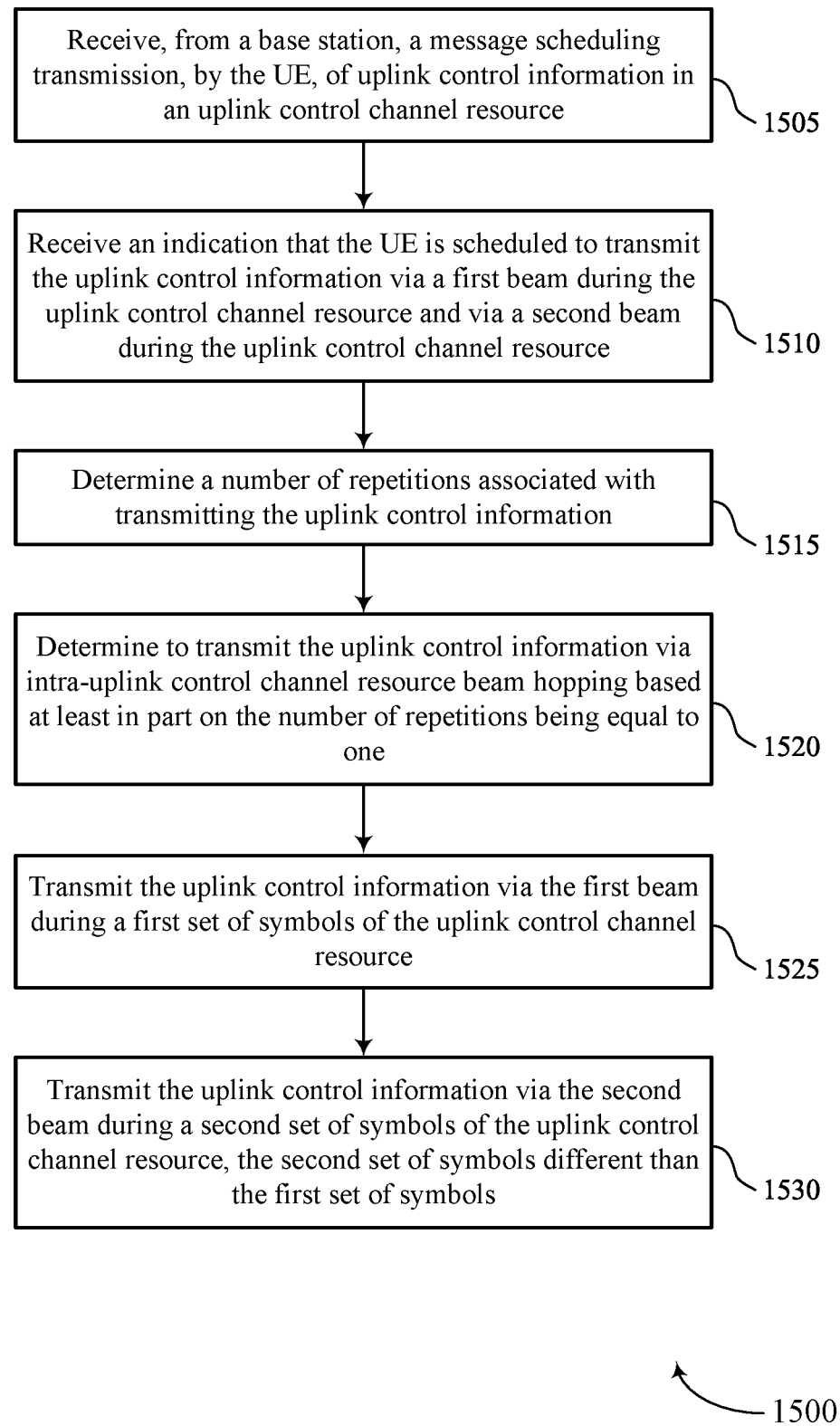

FIG. 15 shows a flowchart illustrating a method 1500 that supports techniques for performing uplink control channel beam hopping and repetition in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, a message scheduling transmission, by the UE, of UCI in an uplink control channel resource. The operations of 1505 may be performed in accordance with examples as disclosed herein. In some examples, aspects of the operations of 1505 may be performed by a transmission scheduling manager 825 as described with reference to FIG. 8.

At 1510, the method may include receiving an indication that the UE is scheduled to transmit the UCI via a first beam during the uplink control channel resource and via a second beam during the uplink control channel resource. The operations of 1510 may be performed in accordance with examples as disclosed herein. In some examples, aspects of the operations of 1510 may be performed by a transmission beams manager 830 as described with reference to FIG. 8.

At 1515, the method may include determining a number of repetitions associated with transmitting the UCI. The operations of 1515 may be performed in accordance with examples as disclosed herein. In some examples, aspects of the operations of 1515 may be performed by a repetition determination manager 835 as described with reference to FIG. 8.

At 1520, the method may include determining to transmit the UCI via intra-uplink control channel resource beam hopping based on the number of repetitions being equal to one. The operations of 1520 may be performed in accordance with examples as disclosed herein. In some examples, aspects of the operations of 1520 may be performed by a transmission configuration determination manager 850 as described with reference to FIG. 8.

At 1525, the method may include transmitting the UCI via the first beam during a first set of symbols of the uplink control channel resource. The operations of 1525 may be performed in accordance with examples as disclosed herein. In some examples, aspects of the operations of 1525 may be performed by an uplink transmission manager 840 as described with reference to FIG. 8.

At 1530, the method may include transmitting the UCI via the second beam during a second set of symbols of the uplink control channel resource, the second set of symbols different than the first set of symbols. The operations of 1530 may be performed in accordance with examples as disclosed herein. In some examples, aspects of the operations of 1530 may be performed by an uplink transmission manager 840 as described with reference to FIG. 8.

Figure 16:
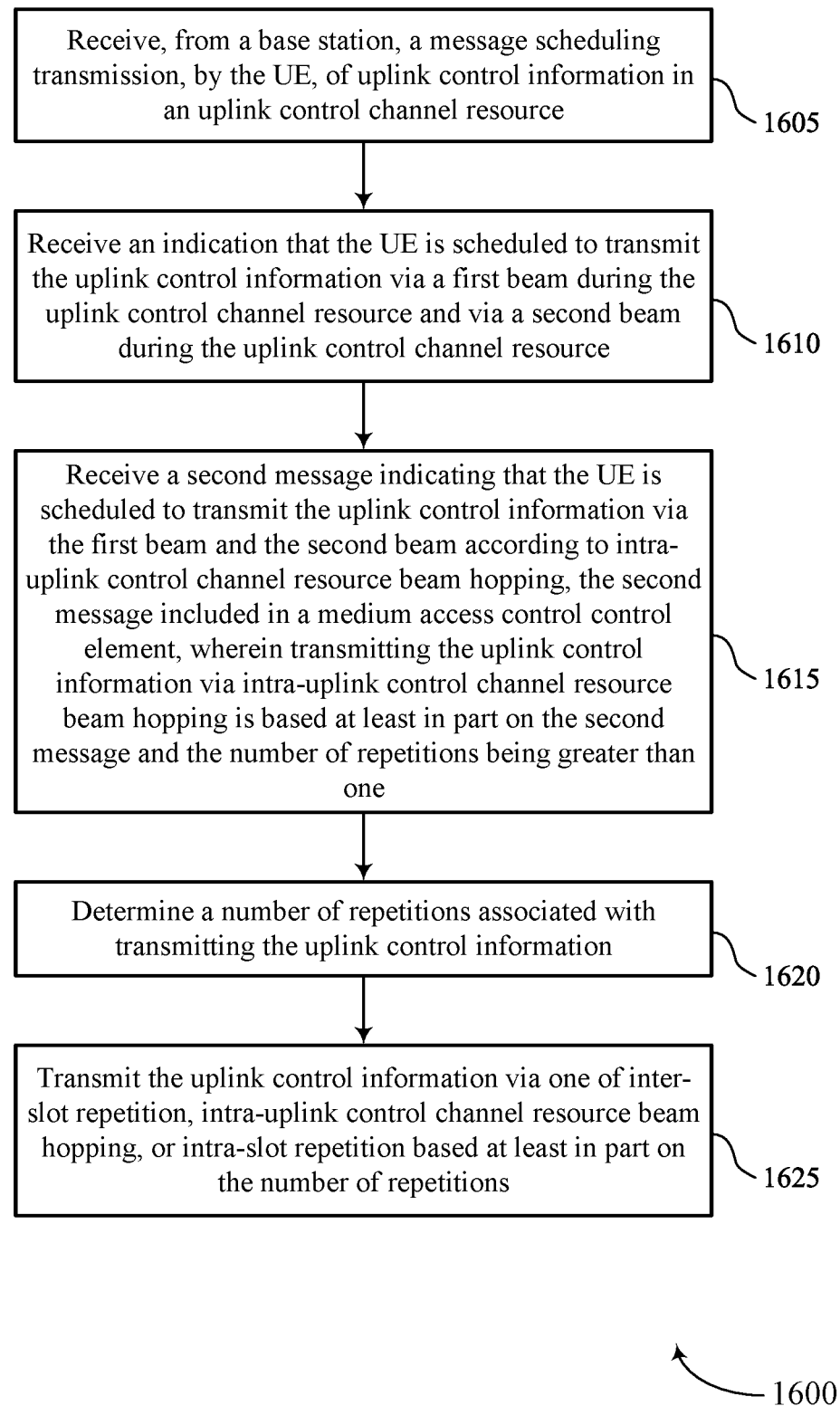

FIG. 16 shows a flowchart illustrating a method 1600 that supports techniques for performing uplink control channel beam hopping and repetition in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a message scheduling transmission, by the UE, of UCI in an uplink control channel resource. The operations of 1605 may be performed in accordance with examples as disclosed herein. In some examples, aspects of the operations of 1605 may be performed by a transmission scheduling manager 825 as described with reference to FIG. 8.

At 1610, the method may include receiving an indication that the UE is scheduled to transmit the UCI via a first beam during the uplink control channel resource and via a second beam during the uplink control channel resource. The operations of 1610 may be performed in accordance with examples as disclosed herein. In some examples, aspects of the operations of 1610 may be performed by a transmission beams manager 830 as described with reference to FIG. 8.

At 1615, the method may include receiving a second message indicating that the UE is scheduled to transmit the UCI via the first beam and the second beam according to intra-uplink control channel resource beam hopping, the second message included in a MAC-CE, where transmitting the UCI via intra-uplink control channel resource beam hopping is based on the second message and the number of repetitions being greater than one. The operations of 1615 may be performed in accordance with examples as disclosed herein. In some examples, aspects of the operations of 1615 may be performed by a transmission configuration indication manager 855 as described with reference to FIG. 8.

At 1620, the method may include determining a number of repetitions associated with transmitting the UCI. The operations of 1620 may be performed in accordance with examples as disclosed herein. In some examples, aspects of the operations of 1620 may be performed by a repetition determination manager 835 as described with reference to FIG. 8.

At 1625, the method may include transmitting the UCI via one of inter-slot repetition, intra-uplink control channel resource beam hopping, or intra-slot repetition based on the number of repetitions. The operations of 1625 may be performed in accordance with examples as disclosed herein. In some examples, aspects of the operations of 1625 may be performed by an uplink transmission manager 840 as described with reference to FIG. 8.

Figure 17:
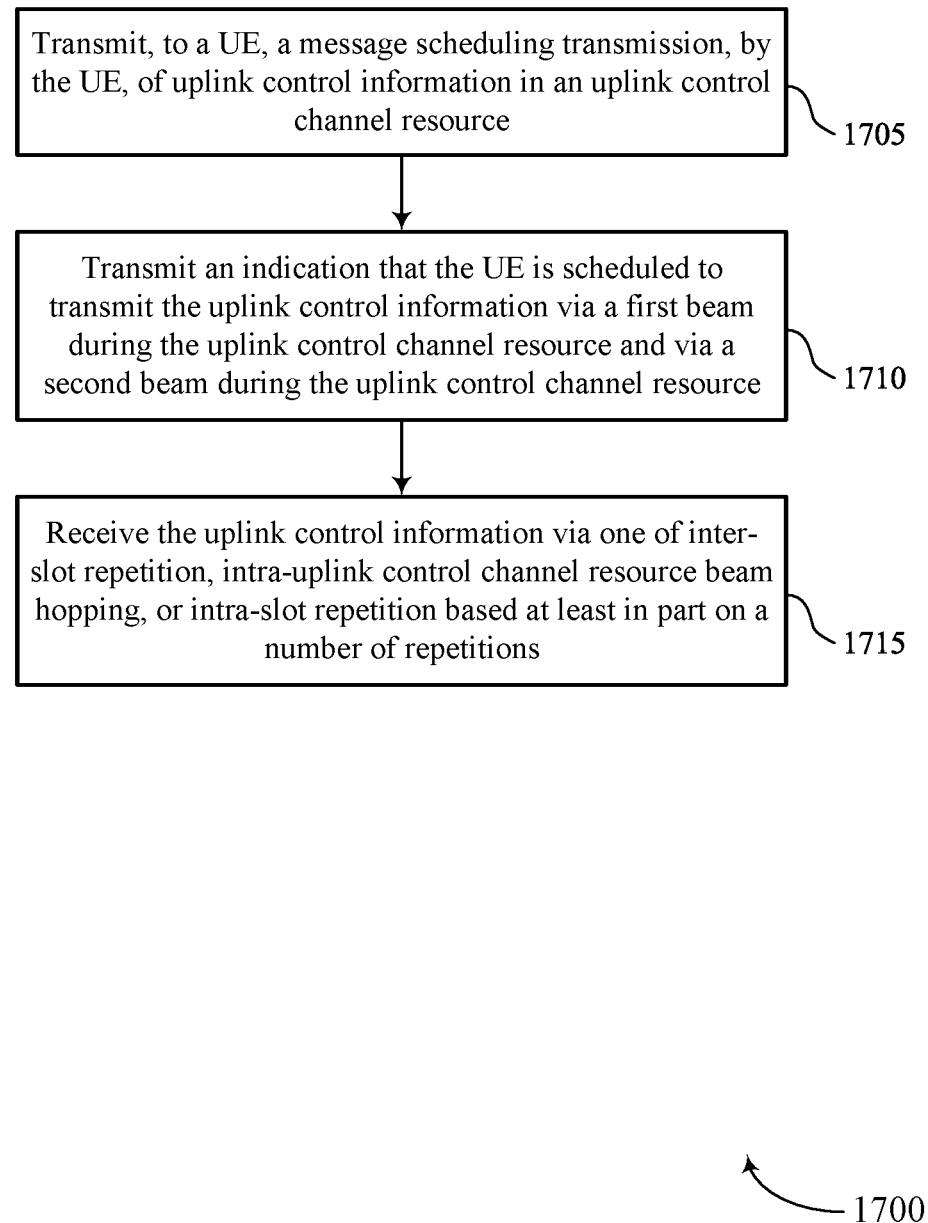

FIG. 17 shows a flowchart illustrating a method 1700 that supports techniques for performing uplink control channel beam hopping and repetition in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, a message scheduling transmission, by the UE, of UCI in an uplink control channel resource. The operations of 1705 may be performed in accordance with examples as disclosed herein. In some examples, aspects of the operations of 1705 may be performed by a transmission scheduling component 1225 as described with reference to FIG. 12.

At 1710, the method may include transmitting an indication that the UE is scheduled to transmit the UCI via a first beam during the uplink control channel resource and via a second beam during the uplink control channel resource. The operations of 1710 may be performed in accordance with examples as disclosed herein. In some examples, aspects of the operations of 1710 may be performed by a transmission beams indication component 1230 as described with reference to FIG. 12.

At 1715, the method may include receiving the UCI via one of inter-slot repetition, intra-uplink control channel resource beam hopping, or intra-slot repetition based at least in part on a number of repetitions. The operations of 1715 may be performed in accordance with examples as disclosed herein. In some examples, aspects of the operations of 1715 may be performed by an uplink transmission receiving component 1235 as described with reference to FIG. 12.

The following provides an overview of aspects of the present disclosure:

Aspect 1: A method for wireless communications at a UE, comprising: receiving, from a base station, a message scheduling transmission, by the UE, of uplink control information in an uplink control channel resource; receiving an indication that the UE is scheduled to transmit the uplink control information via a first beam during the uplink control channel resource and via a second beam during the uplink control channel resource; determining a number of repetitions associated with transmitting the uplink control information; and transmitting the uplink control information via one of inter-slot repetition, intra-uplink control channel resource beam hopping, or intra-slot repetition based at least in part on the number of repetitions.

Aspect 2: The method of aspect 1, wherein determining the number of repetitions further comprises: receiving a second message indicating the number of repetitions associated with transmitting the uplink control information, the number of repetitions greater than one.

Aspect 3: The method of aspect 2, wherein transmitting the uplink control information further comprises: determining to transmit the uplink control information via inter-slot repetition based at least in part on the number of repetitions being greater than one; transmitting the uplink control information via the first beam during the uplink control channel resource in a first slot; and transmitting the uplink control information via the second beam during the uplink control channel resource in a second slot, the second slot different than the first slot.

Aspect 4: The method of aspect 2, wherein transmitting the uplink control information further comprises: determining to transmit the uplink control information via intra-slot repetition based at least in part on the number of repetitions being greater than one; transmitting the uplink control information via the first beam during the uplink control channel resource in a first sub-slot of a slot; and transmitting the uplink control information via the second beam during the uplink control channel resource in a second sub-slot of the slot, the second sub-slot different than the first sub-slot.

Aspect 5: The method of any of aspects 1 through 4, wherein the number of repetitions is equal to one repetition and transmitting the uplink control information further comprises: determining to transmit the uplink control information via intra-uplink control channel resource beam hopping based at least in part on the number of repetitions being equal to one; transmitting the uplink control information via the first beam during a first set of symbols of the uplink control channel resource; and transmitting the uplink control information via the second beam during a second set of symbols of the uplink control channel resource, the second set of symbols different than the first set of symbols.

Aspect 6: The method of any of aspects 1 through 5, further comprising: receiving a second message indicating that the UE is scheduled to transmit the uplink control information via the first beam and the second beam according to intra-uplink control channel resource beam hopping, the second message included in a medium access control (MAC) control element, wherein transmitting the uplink control information via intra-uplink control channel resource beam hopping is based at least in part on the second message and the number of repetitions being greater than one.

Aspect 7: The method of any of aspects 1 through 6, further comprising: monitoring for a second message indicating that the UE is enabled to perform intra-uplink control channel resource beam hopping.

Aspect 8: The method of aspect 7, further comprising: receiving the second message indicating that the UE is enabled to perform intra-uplink control channel resource beam hopping, wherein transmitting the uplink control information via intra-uplink control channel resource beam hopping is based at least in part on the second message and the number of repetitions being greater than one.

Aspect 9: The method of any of aspects 7 through 8, wherein transmitting the uplink control information further comprises: transmitting the uplink control information via inter-slot repetition or intra-slot repetition based at least in part on not receiving the second message.

Aspect 10: The method of any of aspects 1 through 9, further comprising: receiving a second message indicating a first set of uplink control information types and a second set of uplink control information types, the second message indicating that the first set of uplink control information types is associated with intra-uplink control channel resource beam hopping and that the second set of uplink control information types is associated with inter-slot repetition or intra-slot repetition.

Aspect 11: The method of aspect 10, further comprising: determining that the uplink control information is in the first set of uplink control information types; and transmitting the uplink control information via intra-uplink control channel resource beam hopping based at least in part on the uplink control information being in the first set of uplink control information types and the number of repetitions being greater than one.

Aspect 12: The method of aspect 10, further comprising: determining that the uplink control information is in the second set of uplink control information types; and transmitting the uplink control information via inter-slot repetition or intra-slot repetition based at least in part on the uplink control information being in the second set of uplink control information types.

Aspect 13: The method of any of aspects 1 through 12, further comprising: determining that a payload of the uplink control information is greater than a threshold payload size; and transmitting the uplink control information via intra-uplink control channel resource beam hopping based at least in part on the payload of the uplink control information being greater than the threshold payload size and the number of repetitions being greater than one.

Aspect 14: The method of any of aspects 1 through 12, further comprising: determining that a payload of the uplink control information is less than a threshold payload size; and transmitting the uplink control information via inter-slot repetition or intra-slot repetition based at least in part on the payload of the uplink control information being less than the threshold payload size.

Aspect 15: The method of any of aspects 1 through 14, further comprising: monitoring for a second message indicating that the UE is enabled to perform intra-uplink control channel resource beam hopping or indicating the number of repetitions associated with transmitting the uplink control information; and transmitting the uplink control information via the first beam without repetition based at least in part on not receiving the second message.

Aspect 16: The method of any of aspects 1 through 15, further comprising: monitoring for a second message indicating that the UE is enabled to perform intra-uplink control channel resource beam hopping or indicating the number of repetitions associated with transmitting the uplink control information; determining the number of repetitions associated with transmitting the uplink control information is equal to a default number of repetitions based at least in part on not receiving the second message; transmitting the uplink control information via inter-slot repetition or intra-slot repetition in accordance with the default number of repetitions.

Aspect 17: The method of any of aspects 1 through 16, further comprising: monitoring for a second message indicating that the UE is enabled to perform intra-uplink control channel resource beam hopping or indicating the number of repetitions associated with transmitting the uplink control information; transmitting the uplink control information via intra-uplink control channel resource beam hopping based at least in part on not receiving the second message.

Aspect 18: A method for wireless communications at a base station, comprising: transmitting, to a UE, a message scheduling transmission, by the UE, of uplink control information in an uplink control channel resource; transmitting an indication that the UE is scheduled to transmit the uplink control information via a first beam during the uplink control channel resource and via a second beam during the uplink control channel resource; receiving the uplink control information via one of inter-slot repetition, intra-uplink control channel resource beam hopping, or intra-slot repetition based at least in part on a number of repetitions.

Aspect 19: The method of aspect 18, further comprising: transmitting a second message indicating the number of repetitions associated with transmitting the uplink control information, the number of repetitions greater than one.

Aspect 20: The method of aspect 19, wherein receiving the uplink control information further comprises: receiving the uplink control information via the first beam during the uplink control channel resource in a first slot based at least in part on the number of repetitions being greater than one; and receiving the uplink control information via the second beam during the uplink control channel resource in a second slot based at least in part on the number of repetitions being greater than one, the second slot different than the first slot.

Aspect 21: The method of aspect 19, wherein receiving the uplink control information further comprises: receiving the uplink control information via the first beam during the uplink control channel resource in a first sub-slot of a slot based at least in part on the number of repetitions being greater than one; and receiving the uplink control information via the second beam during the uplink control channel resource in a second sub-slot of the slot based at least in part on the number of repetitions being greater than one, the second sub-slot different than the first sub-slot.

Aspect 22: The method of any of aspects 18 through 21, wherein receiving the uplink control information further comprises: receiving the uplink control information via the first beam during a first set of symbols of the uplink control channel resource based at least in part on the number of repetitions associated with receiving the uplink control information being equal to one; and receiving the uplink control information via the second beam during a second set of symbols of the uplink control channel resource, the second set of symbols different than the first set of symbols based at least in part on the number of repetitions associated with receiving the uplink control information being equal to one.

Aspect 23: The method of any of aspects 18 through 22, further comprising: transmitting a second message indicating that the UE is scheduled to transmit the uplink control information via the first beam and the second beam according to intra-uplink control channel resource beam hopping, the second message included in a medium access control (MAC) control element, wherein receiving the uplink control information via intra-uplink control channel resource beam hopping is based at least in part on the second message and the number of repetitions being greater than one.

Aspect 24: The method of any of aspects 18 through 23, further comprising: transmitting a second message indicating that the UE is enabled to perform intra-uplink control channel resource beam hopping, wherein receiving the uplink control information via intra-uplink control channel resource beam hopping is based at least in part on the second message and the number of repetitions being greater than one.

Aspect 25: The method of any of aspects 18 through 24, further comprising: transmitting a second message indicating a first set of uplink control information types and a second set of uplink control information types, the second message indicating that the first set of uplink control information types is associated with intra-uplink control channel resource beam hopping and that the second set of uplink control information types is associated with inter-slot repetition or intra-slot repetition.

Aspect 26: The method of aspect 25, further comprising: receiving the uplink control information via intra-uplink control channel resource beam hopping based at least in part on the uplink control information being in the first set of uplink control information types and the number of repetitions being greater than one.

Aspect 27: The method of aspect 25, further comprising: receiving the uplink control information via inter-slot repetition or intra-slot repetition based at least in part on the uplink control information being in the second set of uplink control information types.

Aspect 28: The method of any of aspects 18 through 27, further comprising: receiving the uplink control information via intra-uplink control channel resource beam hopping based at least in part on a payload of the uplink control information being greater than a threshold and the number of repetitions being greater than one.

Aspect 29: The method of any of aspects 18 through 27, further comprising: receiving the uplink control information via inter-slot repetition or intra-slot repetition based at least in part on a payload of the uplink control information being less than a threshold.

Aspect 30: The method of any of aspects 18 through 29, further comprising: receiving the uplink control information via inter-slot repetition or intra-slot repetition in accordance with a default number of repetitions.

Aspect 31: An apparatus for wireless communications at a UE, comprising at least one processor; and memory coupled with the at least one processor, the memory storing instructions executable by the at least one processor to cause the apparatus to perform a method of any of aspects 1 through 17.

Aspect 32: An apparatus for wireless communications at a UE, comprising at least one means for performing a method of any of aspects 1 through 17.

Aspect 33: A non-transitory computer-readable medium storing code for wireless communications at a UE, the code comprising instructions executable by at least one processor to perform a method of any of aspects 1 through 17.

Aspect 34: An apparatus for wireless communications at a base station, comprising at least one processor; and memory coupled with the at least one processor, the memory storing instructions executable by the at least one processor to cause the apparatus to perform a method of any of aspects 18 through 30.

Aspect 35: An apparatus for wireless communications at a base station, comprising at least one means for performing a method of any of aspects 18 through 30.

Aspect 36: A non-transitory computer-readable medium storing code for wireless communications at a base station, the code comprising instructions executable by at least one processor to perform a method of any of aspects 18 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
at least one processor; and
memory coupled with the at least one processor, the memory storing instructions executable by the at least one processor to cause the apparatus to:
receive a message scheduling transmission of uplink control information in an uplink control channel resource;
receive an indication that the UE is scheduled to transmit the uplink control information via a first beam during the uplink control channel resource and via a second beam during the uplink control channel resource;
determine a number of repetitions associated with transmitting the uplink control information; and
transmit the uplink control information in accordance with an uplink control channel transmission configuration, the uplink control channel transmission configuration selected from inter-slot repetition, intra-uplink control channel resource beam hopping with repetition, intra-slot repetition, or any combination thereof based at least in part on the number of repetitions being greater than one.

2. The apparatus of claim 1, wherein the instructions to determine the number of repetitions are further executable by the at least one processor to cause the apparatus to:
receive a second message indicating the number of repetitions associated with transmitting the uplink control information, the number of repetitions greater than one.

3. The apparatus of claim 2, wherein the instructions to transmit the uplink control information in accordance with the uplink control channel transmission configuration are further executable by the at least one processor to cause the apparatus to:
determine to transmit the uplink control information via inter-slot repetition based at least in part on the number of repetitions being greater than one;
transmit the uplink control information via the first beam during the uplink control channel resource in a first slot; and
transmit the uplink control information via the second beam during the uplink control channel resource in a second slot, the second slot different than the first slot.

4. The apparatus of claim 2, wherein the instructions to transmit the uplink control information in accordance with the uplink control channel transmission configuration are further executable by the at least one processor to cause the apparatus to:
determine to transmit the uplink control information via intra-slot repetition based at least in part on the number of repetitions being greater than one;
transmit the uplink control information via the first beam during the uplink control channel resource in a first sub-slot of a slot; and
transmit the uplink control information via the second beam during the uplink control channel resource in a second sub-slot of the slot, the second sub-slot different than the first sub-slot.

5. The apparatus of claim 1, wherein the instructions are further executable by the at least one processor to cause the apparatus to:
receive a second message indicating that the UE is scheduled to transmit the uplink control information via the first beam and the second beam according to intra-uplink control channel resource beam hopping, the second message included in a medium access control (MAC) control element, wherein transmitting the uplink control information via intra-uplink control channel resource beam hopping is based at least in part on the second message and the number of repetitions being greater than one.

6. The apparatus of claim 1, wherein the instructions are further executable by the at least one processor to cause the apparatus to:
monitor for a second message indicating that the UE is enabled to perform intra-uplink control channel resource beam hopping.

7. The apparatus of claim 6, wherein the instructions are further executable by the at least one processor to cause the apparatus to:
receive the second message indicating that the UE is enabled to perform intra-uplink control channel resource beam hopping, wherein transmitting the uplink control information via intra-uplink control channel resource beam hopping is based at least in part on the second message and the number of repetitions being greater than one.

8. The apparatus of claim 6, wherein the instructions to transmit the uplink control information in accordance with the uplink control channel transmission configuration are further executable by the at least one processor to cause the apparatus to:
transmit the uplink control information via inter-slot repetition or intra-slot repetition based at least in part on not receiving the second message.

9. The apparatus of claim 1, wherein the instructions are further executable by the at least one processor to cause the apparatus to:
receive a second message indicating a first set of uplink control information types and a second set of uplink control information types, the second message indicating that the first set of uplink control information types is associated with intra-uplink control channel resource beam hopping and that the second set of uplink control information types is associated with inter-slot repetition or intra-slot repetition.

10. The apparatus of claim 9, wherein the instructions are further executable by the at least one processor to cause the apparatus to:
determine that the uplink control information is in the first set of uplink control information types; and
transmit the uplink control information via intra-uplink control channel resource beam hopping based at least in part on the uplink control information being in the first set of uplink control information types and the number of repetitions being greater than one.

11. The apparatus of claim 9, wherein the instructions are further executable by the at least one processor to cause the apparatus to:
determine that the uplink control information is in the second set of uplink control information types; and
transmit the uplink control information via inter-slot repetition or intra-slot repetition based at least in part on the uplink control information being in the second set of uplink control information types.

12. The apparatus of claim 1, wherein the instructions are further executable by the at least one processor to cause the apparatus to:
determine that a payload of the uplink control information is greater than a threshold payload size; and
transmit the uplink control information via intra-uplink control channel resource beam hopping based at least in part on the payload of the uplink control information being greater than the threshold payload size and the number of repetitions being greater than one.

13. The apparatus of claim 1, wherein the instructions are further executable by the at least one processor to cause the apparatus to:
determine that a payload of the uplink control information is less than a threshold payload size; and
transmit the uplink control information via inter-slot repetition or intra-slot repetition based at least in part on the payload of the uplink control information being less than the threshold payload size.

14. The apparatus of claim 1, wherein the instructions are further executable by the at least one processor to cause the apparatus to:
monitor for a second message indicating that the UE is enabled to perform intra-uplink control channel resource beam hopping or indicating the number of repetitions associated with transmitting the uplink control information; and
transmit the uplink control information via the first beam without repetition based at least in part on not receiving the second message.

15. The apparatus of claim 1, wherein the instructions are further executable by the at least one processor to cause the apparatus to:
monitor for a second message indicating that the UE is enabled to perform intra-uplink control channel resource beam hopping or indicating the number of repetitions associated with transmitting the uplink control information;
determine the number of repetitions associated with transmitting the uplink control information is equal to a default number of repetitions based at least in part on not receiving the second message; and
transmit the uplink control information via inter-slot repetition or intra-slot repetition in accordance with the default number of repetitions.

16. The apparatus of claim 1, wherein the instructions are further executable by the at least one processor to cause the apparatus to:
monitor for a second message indicating that the UE is enabled to perform intra-uplink control channel resource beam hopping or indicating the number of repetitions associated with transmitting the uplink control information; and
transmit the uplink control information via intra-uplink control channel resource beam hopping based at least in part on not receiving the second message.

17. A method for wireless communications at a user equipment (UE), comprising:
receiving a message scheduling transmission of uplink control information in an uplink control channel resource;
receiving an indication that the UE is scheduled to transmit the uplink control information via a first beam during the uplink control channel resource and via a second beam during the uplink control channel resource;
determining a number of repetitions associated with transmitting the uplink control information; and
transmitting the uplink control information in accordance with an uplink control channel transmission configuration, the uplink control channel transmission configuration selected from inter-slot repetition, intra-uplink control channel resource beam hopping with repetition, intra-slot repetition, or any combination thereof based at least in part on the number of repetitions being greater than one.

18. The method of claim 17, wherein determining the number of repetitions further comprises:
receiving a second message indicating the number of repetitions associated with transmitting the uplink control information, the number of repetitions greater than one.

19. The method of claim 17, further comprising:
receiving a second message indicating that the UE is scheduled to transmit the uplink control information via the first beam and the second beam according to intra-uplink control channel resource beam hopping, the second message included in a medium access control (MAC) control element, wherein transmitting the uplink control information via intra-uplink control channel resource beam hopping is based at least in part on the second message and the number of repetitions being greater than one.

20. The method of claim 17, further comprising:
monitoring for a second message indicating that the UE is enabled to perform intra-uplink control channel resource beam hopping.

21. The method of claim 17, further comprising:
receiving a second message indicating a first set of uplink control information types and a second set of uplink control information types, the second message indicating that the first set of uplink control information types is associated with intra-uplink control channel resource beam hopping and that the second set of uplink control information types is associated with inter-slot repetition or intra-slot repetition.

22. The method of claim 17, further comprising:
determining that a payload of the uplink control information is greater than a threshold payload size; and
transmitting the uplink control information via intra-uplink control channel resource beam hopping based at least in part on the payload of the uplink control information being greater than the threshold payload size and the number of repetitions being greater than one.

23. The method of claim 17, further comprising:
determining that a payload of the uplink control information is less than a threshold payload size; and
transmitting the uplink control information via inter-slot repetition or intra-slot repetition based at least in part on the payload of the uplink control information being less than the threshold payload size.

24. The method of claim 17, further comprising:
monitoring for a second message indicating that the UE is enabled to perform intra-uplink control channel resource beam hopping or indicating the number of repetitions associated with transmitting the uplink control information; and
transmitting the uplink control information via the first beam without repetition based at least in part on not receiving the second message.

25. The method of claim 17, further comprising:
monitoring for a second message indicating that the UE is enabled to perform intra-uplink control channel resource beam hopping or indicating the number of repetitions associated with transmitting the uplink control information;
determining the number of repetitions associated with transmitting the uplink control information is equal to a default number of repetitions based at least in part on not receiving the second message; and
transmitting the uplink control information via inter-slot repetition or intra-slot repetition in accordance with the default number of repetitions.

26. The method of claim 17, further comprising:
monitoring for a second message indicating that the UE is enabled to perform intra-uplink control channel resource beam hopping or indicating the number of repetitions associated with transmitting the uplink control information; and
transmitting the uplink control information via intra-uplink control channel resource beam hopping based at least in part on not receiving the second message.

27. An apparatus for wireless communications at a user equipment (UE), comprising:
means for receiving a message scheduling transmission of uplink control information in an uplink control channel resource;
means for receiving an indication that the UE is scheduled to transmit the uplink control information via a first beam during the uplink control channel resource and via a second beam during the uplink control channel resource;
means for determining a number of repetitions associated with transmitting the uplink control information; and
means for transmitting the uplink control information in accordance with an uplink control channel transmission configuration, the uplink control channel transmission configuration selected from inter-slot repetition, intra-uplink control channel resource beam hopping with repetition, intra-slot repetition, or any combination thereof based at least in part on the number of repetitions being greater than one.

28. A non-transitory computer-readable medium storing code for wireless communications at a user equipment (UE), the code comprising instructions executable by at least one processor to:
receive a message scheduling transmission of uplink control information in an uplink control channel resource;
receive an indication that the UE is scheduled to transmit the uplink control information via a first beam during the uplink control channel resource and via a second beam during the uplink control channel resource;
determine a number of repetitions associated with transmitting the uplink control information; and
transmit the uplink control information in accordance with an uplink control channel transmission configuration, the uplink control channel transmission configuration selected from inter-slot repetition, intra-uplink control channel resource beam hopping with repetition, intra-slot repetition, or any combination thereof based at least in part on the number of repetitions being greater than one.

* * * * *